US010733416B2

(12) United States Patent
Miyoshino et al.

(10) Patent No.: US 10,733,416 B2
(45) Date of Patent: Aug. 4, 2020

(54) INFORMATION PROCESSING METHOD, INFORMATION PROCESSING DEVICE, AND NON-TRANSITORY COMPUTER-READABLE MEDIUM

(71) Applicant: KABUSHIKI KAISHA DDS, Nagoya-shi, Aichi (JP)

(72) Inventors: Kenji Miyoshino, Nagoya (JP); Tatsuki Yoshimine, Nagoya (JP); Noriyuki Gonda, Nagoya (JP); Yuhei Niwa, Nagoya (JP)

(73) Assignee: KABUSHIKI KAISHA DDS, Nagoya (JP)

( * ) Notice: Subject to any disclaimer, the term of this patent is extended or adjusted under 35 U.S.C. 154(b) by 0 days.

(21) Appl. No.: 16/370,044

(22) Filed: Mar. 29, 2019

(65) Prior Publication Data
US 2019/0228198 A1    Jul. 25, 2019

Related U.S. Application Data

(63) Continuation of application No. PCT/JP2016/080019, filed on Oct. 7, 2016.

(51) Int. Cl.
*G06T 7/00* (2017.01)
*G06K 9/00* (2006.01)
(Continued)

(52) U.S. Cl.
CPC ............. *G06K 9/001* (2013.01); *G06F 17/18* (2013.01); *G06K 9/0002* (2013.01); *G06T 7/00* (2013.01);
(Continued)

(58) Field of Classification Search
CPC ........... G06K 9/00006; G06K 9/00013; G06K 9/001; G06K 9/0002; G06K 9/00067;
(Continued)

(56) References Cited

U.S. PATENT DOCUMENTS

| 5,426,708 A | 6/1995 | Hamada et al. |
| 2002/0018585 A1* | 2/2002 | Kim ................ G07C 9/257 |
| | | 382/125 |

(Continued)

FOREIGN PATENT DOCUMENTS

| JP | H02-153478 A | 6/1990 |
| JP | 2000-132692 A | 5/2000 |

(Continued)

OTHER PUBLICATIONS

U.S. Appl. No. 16/383,733, filed Apr. 15, 2019 in the name of Kenji Miyoshino et al.

(Continued)

*Primary Examiner* — Antonio Xavier
(74) *Attorney, Agent, or Firm* — Oliff PLC

(57) ABSTRACT

A processor of an information processing device acquires an image, determines base point from the image, and acquires first position information of the base point. The processor determines a reference direction indicating characteristics of color information of a section of the image around the base point. The processor acquires a sample for each of a plurality of reference points acquired sequentially in accordance with a predetermined condition from a starting point determined on the basis of the base point and the reference direction. The processor calculates as frequency information, frequency components of changes in the color information with respect to the second position information for the plurality of samples, using a linear prediction coefficient calculated using a Yule-Walker method without applying a window function. The processor causes the memory to store information associating the frequency information, the first position information and the reference direction, as collation information.

20 Claims, 28 Drawing Sheets

(51) Int. Cl.
  *G06T 7/90* (2017.01)
  *G06T 7/73* (2017.01)
  *G06F 17/18* (2006.01)
(52) U.S. Cl.
  CPC ............... *G06T 7/74* (2017.01); *G06T 7/90* (2017.01); *G06T 2207/20212* (2013.01)
(58) Field of Classification Search
  CPC ... G06T 7/74; G06T 7/90; G06T 2207/20212; G06F 17/18
  See application file for complete search history.

(56) References Cited

U.S. PATENT DOCUMENTS

| | | | |
|---|---|---|---|
| 2002/0181749 A1* | 12/2002 | Matsumoto | G06K 9/00006 382/125 |
| 2004/0062425 A1 | 4/2004 | Uchida | |
| 2007/0003114 A1* | 1/2007 | Hendriks | G06K 9/00288 382/124 |
| 2009/0245603 A1* | 10/2009 | Koruga | A61B 5/415 382/128 |
| 2009/0303336 A1* | 12/2009 | Utsugi | G06T 7/11 348/222.1 |
| 2009/0310831 A1 | 12/2009 | Zhang et al. | |
| 2012/0148087 A1 | 6/2012 | Xu et al. | |
| 2015/0062307 A1* | 3/2015 | Ishiga | H04N 13/257 348/49 |
| 2018/0137331 A1* | 5/2018 | Miyoshino | G06K 9/6211 |

FOREIGN PATENT DOCUMENTS

| | | |
|---|---|---|
| JP | 3057590 B2 | 6/2000 |
| JP | 2004-118677 A | 4/2004 |
| JP | 2007-504524 A | 3/2007 |
| JP | 2012-129991 A | 7/2012 |
| JP | 2016-40682 A | 3/2016 |
| JP | 2016-40683 A | 3/2016 |

OTHER PUBLICATIONS

U.S. Appl. No. 16/383,758, filed Apr. 15, 2019 in the name of Kenji Miyoshino et al.
Nov. 8, 2016 International Search Report issued in International Patent Application No. PCT/JP2016/080019.
Dec. 19, 2017 International Search Report issued in International Patent Application No. PCT/JP2017/039416.
Dec. 19, 2017 International Search Report issued in International Patent Application No. PCT/JP2017/039417.
Anil K. Jain et al. "Pores and Ridges: High-Resolution Fingerprint Matching Using Level 3 Features". IEEE Transactions on Pattern Analysis and Machine Intelligence, vol. 29, No. 1, Jan. 2007, pp. 15-27.
May 5, 2020 Notice of Allowance issued in U.S. Appl. No. 16/383,758.
May 6, 2020 Notice of Allowance issued in U.S. Appl. No. 16/383,731.

* cited by examiner

FIG. 20

| COORDINATES OF BASE POINT OF REFERENCE IMAGE | COORDINATES OF BASE POINT OF TEST IMAGE | D1 |
|---|---|---|
| (86, 31) | (103, 35) | ⋮ |
| ⋮ | ⋮ | ⋮ |

85

INFORMATION PROCESSING METHOD, INFORMATION PROCESSING DEVICE, AND NON-TRANSITORY COMPUTER-READABLE MEDIUM

CROSS REFERENCE TO RELATED APPLICATION

This application is a Continuation Application of International Application No. PCT/JP2016/080019, filed Oct. 7, 2016. This disclosure of the foregoing application is hereby incorporated by reference in its entirety.

BACKGROUND

The present disclosure relates to an information processing method, an information processing device, and a non-transitory computer-readable medium that are configured to analyze an image and generate collation information used for collation of biometric information.

Recently, various types of fingerprint authentication devices that can be installed in mobile devices, such as a smart phone and a notebook personal computer, have been proposed. For example, a known personal identification device uses, as collation information used for collation, information obtained by performing frequency spectrum conversion on a fingerprint image. Thus, the personal identification device is unlikely to be affected by disturbance, such as inclination of a finger with respect to a fingerprint sensor.

SUMMARY

In accordance with miniaturization of a fingerprint sensor that is installed in a mobile device, an image of an acquired finger print becomes smaller than in related art. When a user performs an input operation of a fingerprint, in many cases, the user causes a finger of the hand that is holding the mobile device to touch the fingerprint sensor installed in the mobile device. In this case, since the user has to move the finger in an unnatural direction, the input operation of the fingerprint tends to become unstable. More specifically, an image acquired under conditions in which a position and an angle are different from those at the time of registration tends to be acquired. Accordingly, even when the size of the image is smaller than in the related art, a technology is required that generates collation information that is unlikely to be affected by acquisition conditions of biometric information.

Various embodiments of the broad principles derived herein provide an information processing method, an information processing device, and a non-transitory computer-readable medium that are capable of generating collation information that is unlikely to be affected by acquisition conditions of biometric information even when a size of an image representing the biometric information is smaller than in related art.

Embodiments provide an information processing method for an information processing device including a memory includes acquiring an image, determining a base point from the acquired image acquired, and acquiring first position information corresponding to a position of the base point on the image. The information processing method includes determining a reference direction indicating characteristics of color information of a section of the image around the determined base point determined. The information processing method includes acquiring a sample for each of a plurality of reference points, the plurality of reference points being on a circumference of a circle whose center is the determined base point and whose radius is a predetermined value, and the plurality of reference points being acquired sequentially in accordance with a predetermined condition from a starting point determined on the basis of the base point and the reference direction, the sample being information that associates the color information corresponding to the reference points with second position information corresponding to the positions of the reference points on the image. The information processing method includes calculating, as frequency information, frequency components of changes in the color information with respect to the second position information for the plurality of acquired samples, using a linear prediction coefficient calculated using a Yule-Walker method without applying a window function. The information processing method includes causing the memory to store information associating the calculated frequency information, the first position information and the reference direction, as collation information used for collation of biometric information.

Embodiments also provide an information processing device that includes a processor and a memory. The memory is configured to store computer-readable instructions that, when executed by the processor. The processes include acquiring an image, determining a base point from the acquired image acquired, and acquiring first position information corresponding to a position of the base point on the image. The processes include determining a reference direction indicating characteristics of color information of a section of the image around the determined base point determined. The processes include acquiring a sample for each of a plurality of reference points, the plurality of reference points being on a circumference of a circle whose center is the determined base point and whose radius is a predetermined value, and the plurality of reference points being acquired sequentially in accordance with a predetermined condition from a starting point determined on the basis of the base point and the reference direction, the sample being information that associates the color information corresponding to the reference points with second position information corresponding to the positions of the reference points on the image. The processes include calculating, as frequency information, frequency components of changes in the color information with respect to the second position information for the plurality of acquired samples, using a linear prediction coefficient calculated using a Yule-Walker method without applying a window function. The processes include causing the memory to store information associating the calculated frequency information, the first position information and the reference direction, as collation information used for collation of biometric information.

Embodiments further provide a non-transitory computer-readable medium that stores computer-readable instructions that, when executed, instruct a processor of an information processing device to perform processes. The processes include acquiring an image, determining a base point from the acquired image acquired, and acquiring first position information corresponding to a position of the base point on the image. The processes include determining a reference direction indicating characteristics of color information of a section of the image around the determined base point determined. The processes include acquiring a sample for each of a plurality of reference points, the plurality of reference points being on a circumference of a circle whose center is the determined base point and whose radius is a predetermined value, and the plurality of reference points being acquired sequentially in accordance with a predetermined condition from a starting point determined on the basis of the base point and the reference direction, the sample being information that associates the color information corresponding to the reference points with second position information corresponding to the positions of the reference points on the image. The processes include calculating, as frequency information, frequency components of changes in the color information with respect to the second position information for the plurality of acquired samples, using a linear prediction coefficient calculated using a Yule-Walker method without applying a window function. The processes include causing the memory to store information associating the calculated frequency information, the first position information and the reference direction, as collation information used for collation of biometric information.

BRIEF DESCRIPTION OF THE DRAWINGS

Embodiments of the disclosure will be described below in detail with reference to the accompanying drawings in which:

FIG. 20 is an explanatory diagram of a list;

DETAILED DESCRIPTION OF EMBODIMENTS

An embodiment of the present disclosure will be explained with reference to the drawings. Specific numerical values exemplified in the embodiment below are examples, and the present disclosure is not limited to these numerical values. In the explanation below, image data is simply referred to as an "image."

An information processing device 10 will be explained with reference to FIG. 1. The information processing device 10 is an electronic device provided with a function to generate collation information used for collation from biometric information. The biometric information is selected from among various types of biometric information that can be acquired as an image, such as a face image, a fingerprint, a vein, an iris or the like. The biometric information of the present embodiment is a fingerprint. The information processing device 10 of the present embodiment is a known smart phone. The information processing device 10 is provided with functions to analyze an image obtained by capturing a fingerprint, generate reference collation information that is necessary for the collation using the fingerprint, and store the generated reference collation information in a data base (DB) 28 stored in a flash memory 4 of the information processing device 10. The information processing device 10 is provided with functions to analyze the image obtained by capturing the fingerprint, generate test collation information that is necessary for the collation using the fingerprint, and determine correspondence between the generated test collation information and the reference collation information stored in the DB 28.

Figure 1:
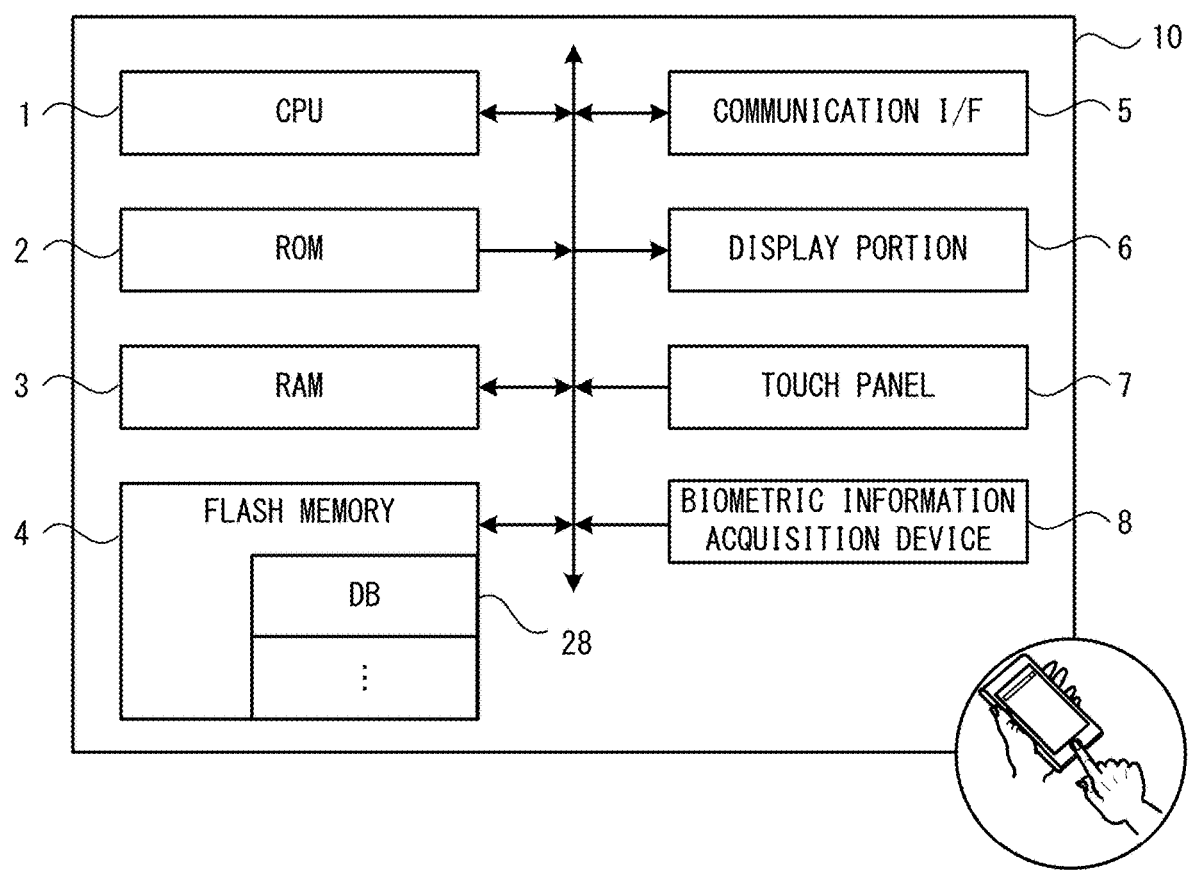
FIG. 1 is a block diagram of an information processing device.

As shown in FIG. 1, the information processing device 10 is provided with a CPU 1, a ROM 2, a RAM 3, the flash memory 4, a communication I/F 5, a display portion 6, a touch panel 7 and a biometric information acquisition device 8. The CPU 1 is a processor that performs control of the information processing device 10. The CPU 1 is electrically connected to the ROM 2, the RAM 3, the flash memory 4, the communication I/F 5, the display portion 6, the touch panel 7 and the biometric information acquisition device 8. The ROM 2 stores a BIOS, a boot program and initial setting values. The RAM 3 stores various temporary data. The flash memory 4 stores a program that is executed by the CPU 1 to control the information processing device 10, an operating system (OS) and the DB 28. The communication I/F 5 is a controller to perform communication with an external device. The display portion 6 is a liquid crystal display. The touch panel 7 is provided on the surface of the display portion 6. The biometric information acquisition device 8 acquires an image obtained by capturing biometric information. The biometric information acquisition device 8 of the present embodiment is an area-type sensor of a capacitance type. Specifically, the biometric information acquisition device 8 is a sensor that determines the ridges and troughs of the fingerprint from an electric charge amount of a matrix of surface electrodes, and shows color information per pixel using 256 gray-scale values. The color information is information indicating color. The resolution is, for example, 508 dots per inch (dpi).

Figure 2:
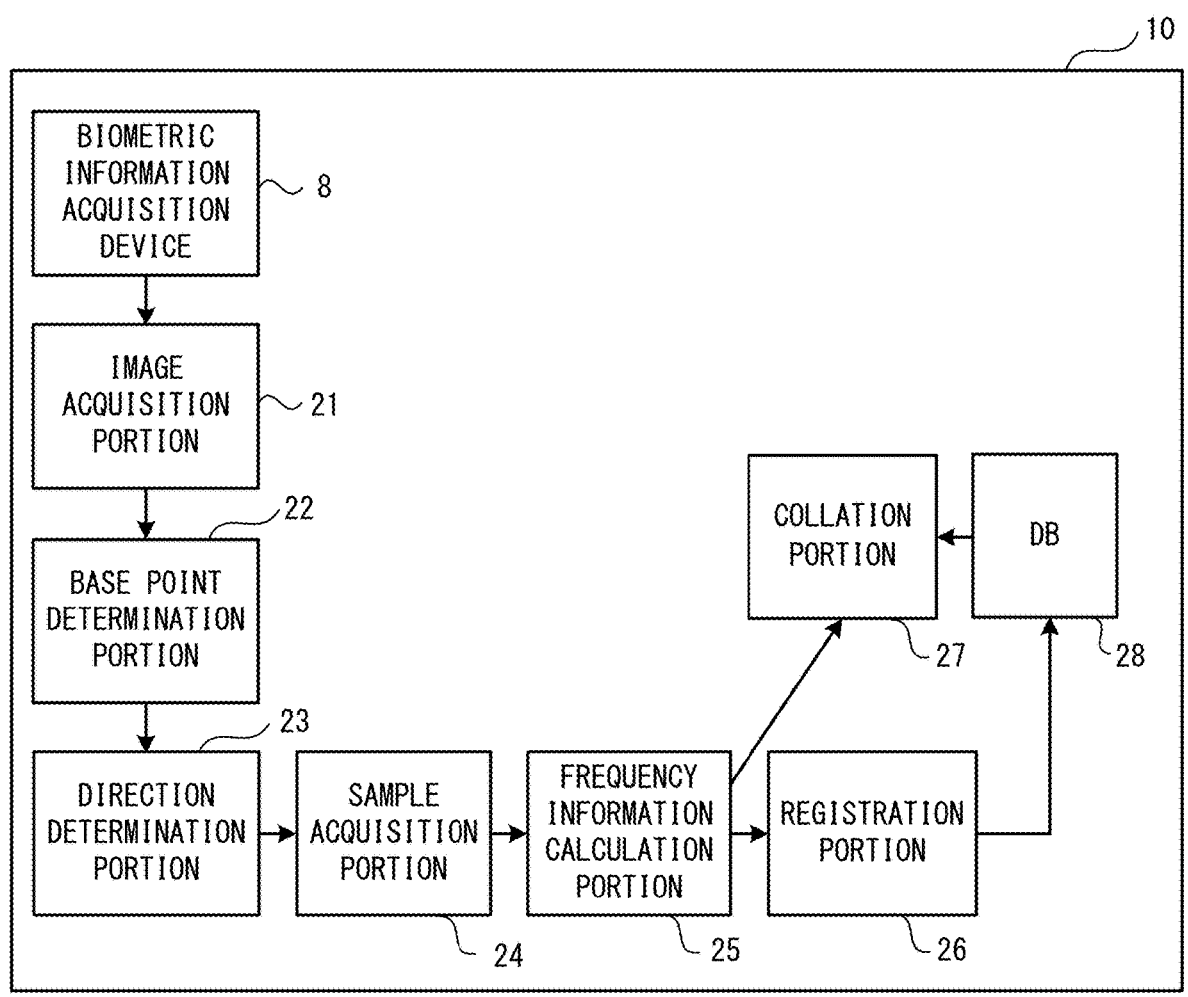
FIG. 2 is a functional block diagram of the information processing device.
Figure 3:
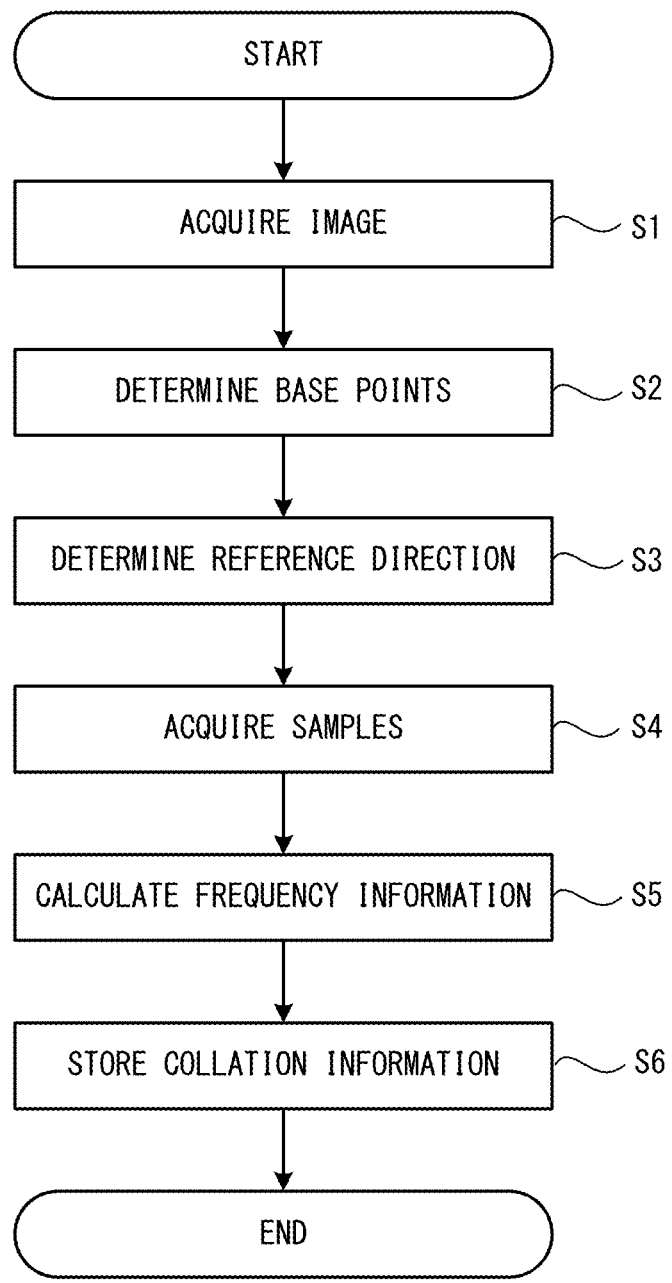
FIG. 3 is a flowchart of acquisition processing.

An overview of the functions of the information processing device 10 will be explained with reference to FIG. 2 and FIG. 3. The information processing device 10 has the biometric information acquisition device 8, an image acquisition portion 21, a base point determination portion 22, a direction determination portion 23, a sample acquisition portion 24, a frequency information calculation portion 25, a registration portion 26, a collation portion 27 and a DB 28, and processing that corresponds to a functional block of each of them is performed by the CPU 1 (refer to FIG. 1).

The biometric information acquisition device 8 outputs an image to the image acquisition portion 21. The image acquisition portion 21 acquires the image output from the biometric information acquisition device 8 (step S1). The base point determination portion 22 determines a base point based on the image acquired by the processing at step S1, and acquires first position information that is information corresponding to a position of the base point on the image (step S2). The base point is a point on the image determined in accordance with predetermined conditions. The base point of the present embodiment is a point arranged at a specific position on the image. The position of the base point on the image is represented by two-dimensional coordinates of an image coordinate system. It is assumed that the two-dimensional coordinates of the image coordinate system of the present embodiment are coordinates that are set in units of pixels on the basis of positions of pixels in the image. The two-dimensional coordinates of the image coordinate system will be described later.

The direction determination portion 23 determines a reference direction, which is a direction indicating characteristics of color information of a section of the image around the base point determined by the processing at step S2 (step S3). It is sufficient that the reference direction is a direction indicating the characteristics of the color information of the section of the image that surrounds the base point, and is, for example, a value that is calculated by two-dimensional Fourier transform or the like of the color information in a predetermined range centered on the base point.

The sample acquisition portion 24 acquires samples (step S4). The samples are information that associates the color information corresponding to reference points with second position information that is information corresponding to positions of the reference points on the image. The reference points are points on the circumference of a circle whose center is the base point determined at step S2 and whose radius is a predetermined value. At step S4, a point that is determined on the basis of the base point and the reference direction is taken as a starting point, and the samples are acquired for each of the plurality of reference points that are sequentially acquired in accordance with predetermined conditions.

Figure 4:
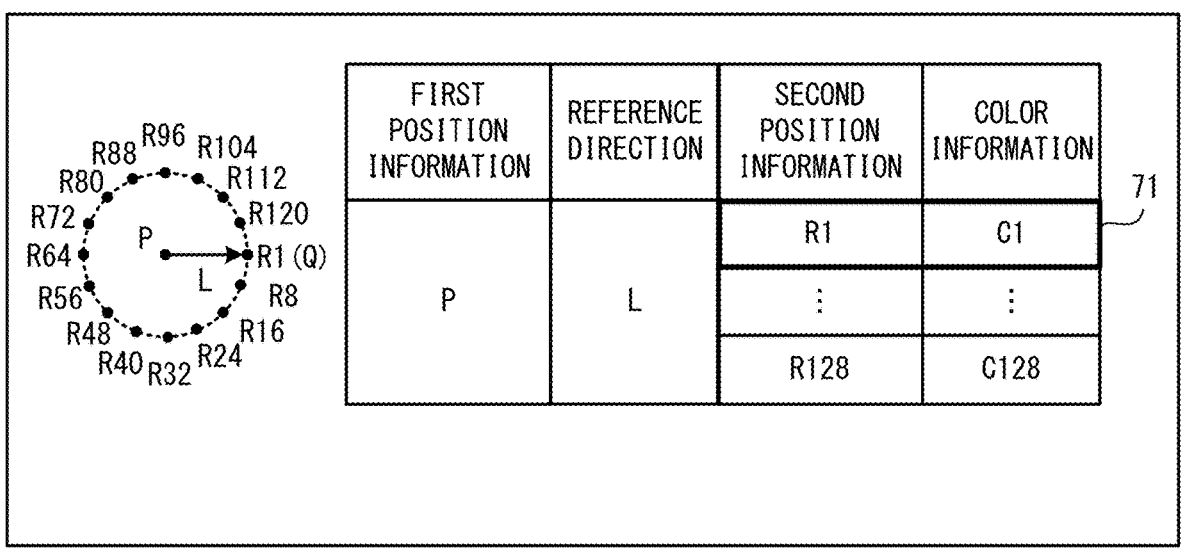
FIG. 4 is an explanatory diagram of an acquisition procedure of samples and sample data.

The samples are acquired by the following procedure, for example. In order to simplify the explanation, a case will be explained in which a single starting point Q is set for a single base point P and there are 128 reference points R. As shown in FIG. 4, the sample acquisition portion 24 determines, as the starting point Q, a point whose distance from the base point P determined by the base point determination portion 22 is a predetermined value and which is in a reference direction L determined by the direction determination portion 23 in relation to the base point P. The sample acquisition portion 24 acquires a predetermined number of the reference points in accordance with the predetermined conditions. For example, in accordance with the predetermined conditions, the sample acquisition portion 24 sequentially sets 128 reference points Rm (m is an integer from 1 to 128) at equal intervals in a clockwise direction from the starting point Q, on the circumference of the circle whose center is the base point P and whose radius is the predetermined value. When the reference points Rm have coordinates in units of sub-pixels, the color information is acquired using known bilinear interpolation or bicubic interpolation. The sample acquisition portion 24 acquires samples 71 that associate color information Cm corresponding to the reference points Rm with the second position information. The samples 71 are associated with the first position information that indicates the position of the base point on the image. It is sufficient that the first position information is information that defines the position of the base point on the image. For example, the first position information may be absolute coordinates (for example, coordinates of the image coordinate system), relative coordinates, an acquisition order, or the like. The first position information of the present embodiment is represented by the coordinates of the image coordinate system. It is sufficient that the second position information is information that defines the positions of the reference points in relation to the base point. For example, the second position information may be absolute coordinates (for example, coordinates of the image coordinate system), relative coordinates, an angle in relation to a reference, or the like. When the order of acquisition of the reference points is determined with respect to a point used as the reference (the starting point, for example), the second position information may be the order of acquisition of the reference points. In the present embodiment, the order of acquisition of the reference points is acquired as the second position information. The order of acquisition of the reference points R1 to R128 is 1 to 128, respectively. The plurality of samples 71 are samples acquired for each of the plurality of reference points Rm whose positions are different from each other. The sample acquisition portion 24 uses, as sample data 72, information that associates the plurality of samples 71 acquired for the single starting point Q with the first position information.

Figure 5:
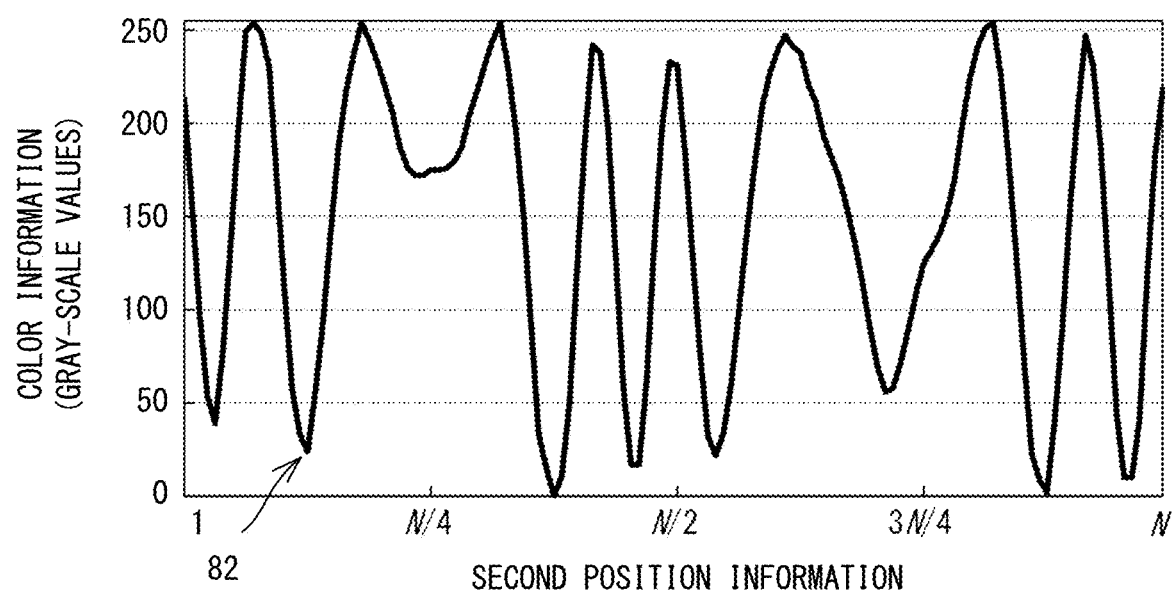
FIG. 5 is a graph showing changes in color information with respect to second position information, on the basis of sample data.
Figure 6:
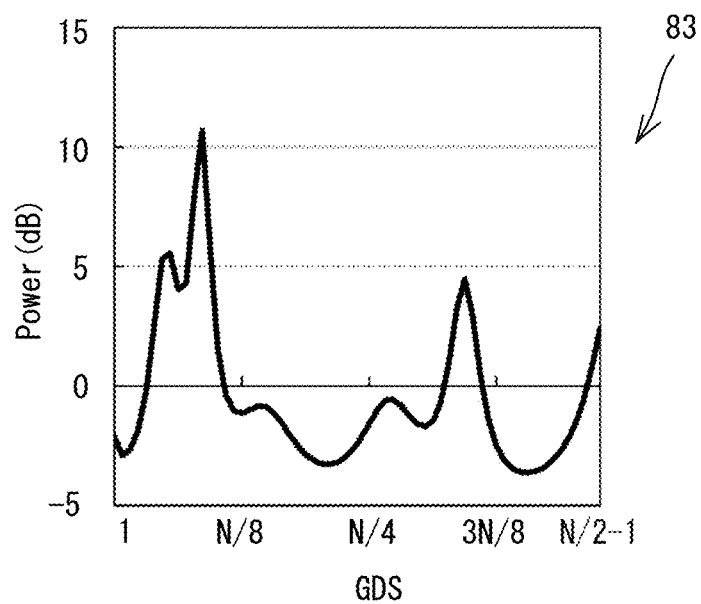
FIG. 6 is a diagram showing frequency information calculated for the sample data.

The frequency information calculation portion 25 uses a linear prediction coefficient, which is calculated using the Yule-Walker method without applying a window function, to calculate, as frequency information, frequency components of changes in the color information with respect to the second position information for the plurality of samples (the sample data) acquired by the sample acquisition portion 24 (step S5). The frequency components are, for example, a known LPC spectrum, an LPC cepstrum, a group delay spectrum, and the like. The frequency components are, for example, the group delay spectrum (GDS), and are defined as the frequency derivative of a phase spectrum in a power transfer function. As shown in FIG. 5 and FIG. 6, a GDS 83 calculated on the basis of sample data 82 separates and emphasizes individual peaks of the frequency spectrum of the sample data 82. The number of elements of the arrangement of the GDS is the number obtained by subtracting 1 from the number of elements of the phase spectrum. Specifically, the CPU 1 uses the linear prediction coefficient calculated using the Yule-Walker method without applying the window function, and calculates the GDS by obtaining the phase derivative of a power spectrum obtained by performing a high-speed Fourier transform on a weighted LPC coefficient. The CPU 1 uses the calculated GDS as the frequency information.

Figure 7:
FIG. 7 is an explanatory diagram of collation information that includes first position information, a reference direction and frequency information.

The registration portion 26 causes information that associates the frequency information acquired at step S5, the first position information and the reference direction to be stored in the DB 28, as collation information used for collation of biometric information (step S6). For example, the registration portion 26 causes collation information 84 shown in FIG. 7 to be stored in the DB 28.

1. Processing at Registration

Figure 8:
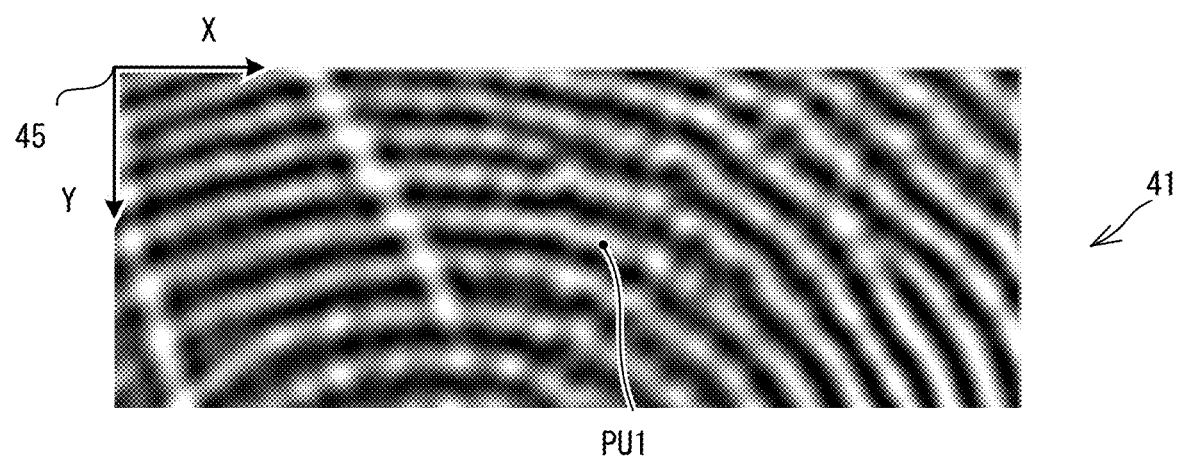
FIG. 8 is an image representing reference biometric information acquired from a biometric information acquisition device.
Figure 23:
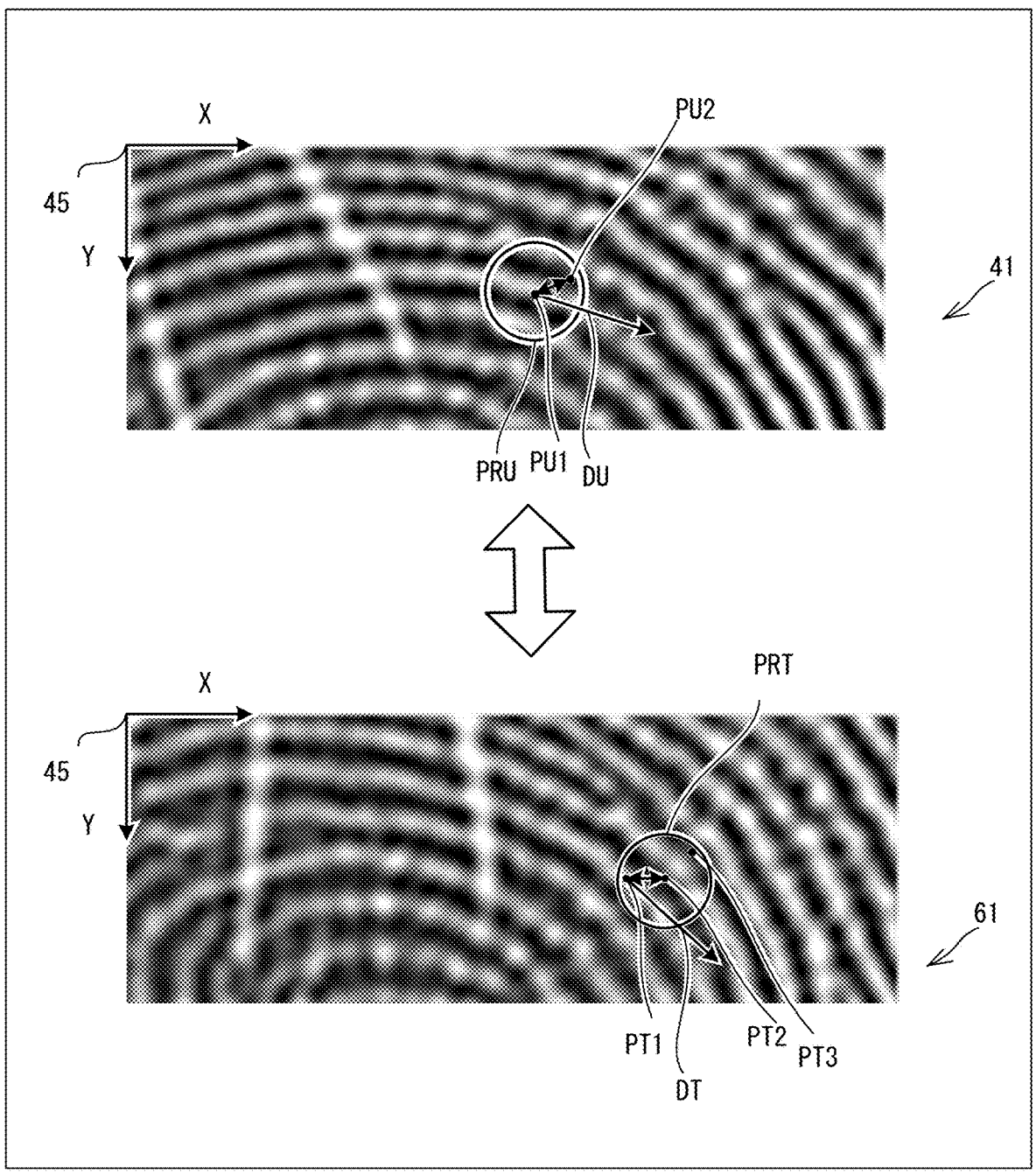
FIG. 23 is an explanatory diagram of processing that is performed in the Wsum calculation processing.

Collation information processing of a first embodiment that is performed by the information processing device 10 will be explained with reference to FIG. 8. to FIG. 23, taking, as an example, a case in which the collation information based on an image 41 shown in FIG. 8 is registered in the DB 28. The collation information processing is started when a user inputs a start command. The start command includes a command as to whether to register the collation information acquired from the image in the DB 28 as reference collation information, or whether to use the collation information acquired from the image as test collation information and to calculate a degree of similarity between the test collation information and the reference collation information registered in the DB 28. When the CPU 1 of the information processing device 10 detects the input of the start command of the collation information processing, the CPU 1 reads out, to the RAM 3, an information processing program stored in the flash memory 4 to execute the collation information processing, and performs processing of respective steps to be described below, in accordance with instructions included in the information processing program. In the present embodiment, feedback processing that prompts re-input is performed until the biometric information that satisfies a requirement (for example, the brightness of the image) to extract the base point is acquired. The biometric information that is acquired in the collation information processing satisfies a requirement to extract the collation information from the biometric information using an algorithm. Information or data acquired or generated in the course of the processing is stored in the RAM 3 as appropriate. Various setting values that are necessary for the processing are stored in advance in the flash memory 4. Hereinafter, step is abbreviated to "S."

Figure 9:
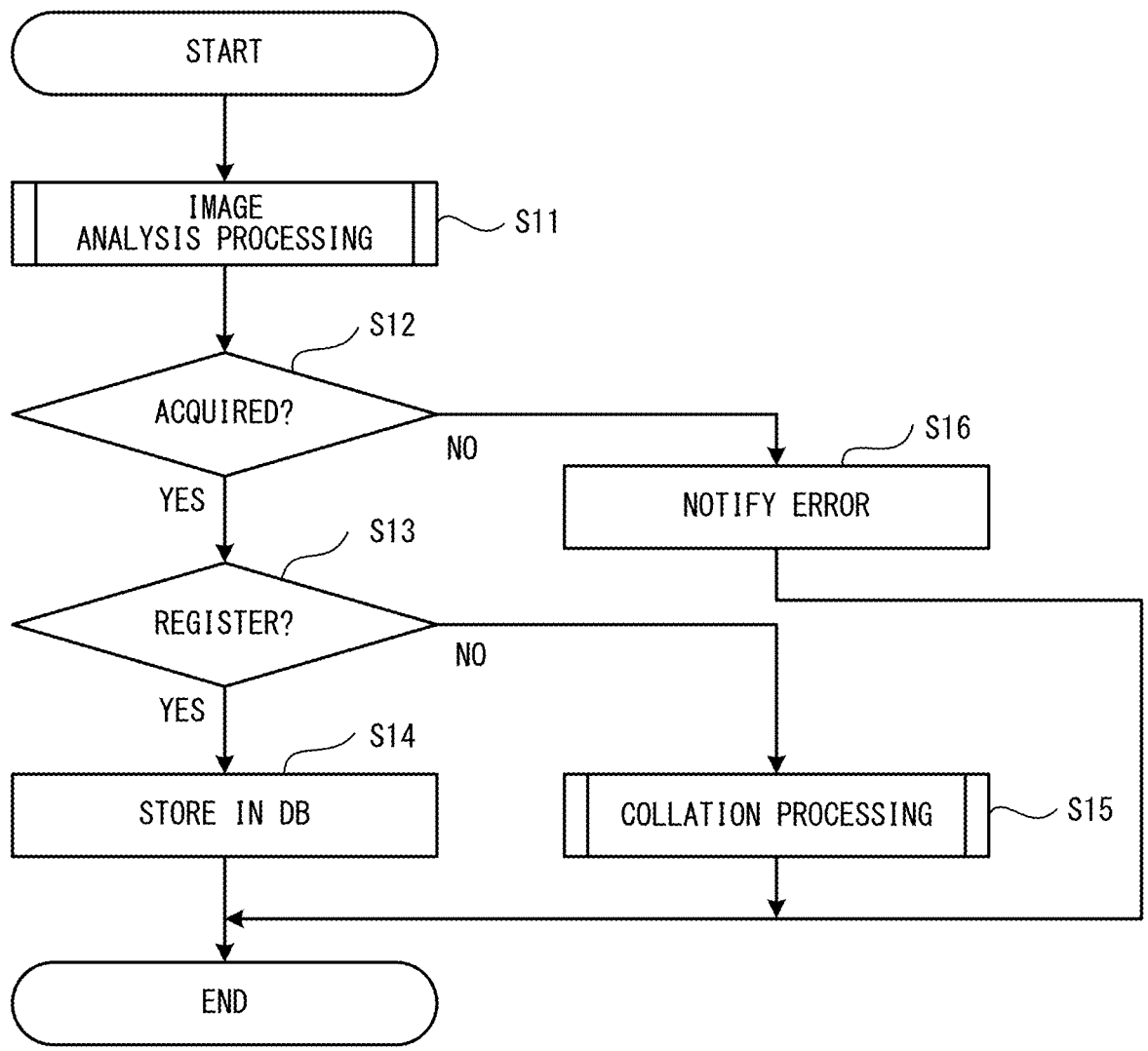
FIG. 9 is a flowchart of collation information processing.

As shown in FIG. 9, the CPU 1 performs image analysis processing (S11). The image analysis processing will be explained with reference to FIG. 10. When a finger touch is detected, the biometric information acquisition device 8 outputs a signal that can identify a captured image of a fingerprint to the CPU 1. The CPU 1 receives the signal output from the biometric information acquisition device 8. The CPU 1 acquires the image on the basis of the received signal (S21). For example, the image 41 shown in FIG. 8 is acquired at S21. Two-dimensional coordinates of the image coordinate system shown by X and Y are set in the image 41. The CPU 1 sets a position of a pixel at the upper left of the image 41 as an origin 45 of the two-dimensional coordinates of the image coordinate system. A position of a pixel which is separated from the origin 45 of the two-dimensional coordinates by x pixels in the positive X direction (the rightward direction in FIG. 8) and which is separated from the origin 45 by y pixels in the positive Y direction (the downward direction in FIG. 8) is denoted by coordinates (x, y). The image 41 is a rectangular image of 160 pixels in the X direction (the left-right direction) and 60 pixels in the Y direction (the up-down direction). The resolution, size and the like of the image acquired at S21 may be changed as appropriate.

The CPU 1 sets a variable N to 0 (S22). The variable N is used in processing to count the number of points in the image that can be acquired as the base points. The CPU 1 selects a point in accordance with predetermined conditions from the image acquired at S21 (S23). From among the points represented in units of pixels in the image, the CPU 1 of the present embodiment acquires all the points in units of pixels in a rectangular area that is offset by a predetermined value from the outer circumference of the image, in a predetermined order on the basis of the coordinates indicated by the image coordinate system. The predetermined value is the same as the value that is used when acquiring samples at S32 to be described later, and is set in order to acquire, as the base points, points for which the samples can be acquired. The CPU 1 determines the reference direction for the points in the image acquired by the processing at S22 (S24). The reference direction is indicated by, for example, an angle in the clockwise direction around the X axis of the image coordinate system. The CPU 1 of the present embodiment sets, as the reference direction, a direction in which the power spectrum of the two-dimensional Fourier transform of the color information in a specific range centered on the point selected by the processing at S23 is peaked. The CPU 1 determines whether or not the point selected by the processing at S23 is a point in an effective area (S25). The effective area is an area in which the samples can be acquired and in which a biometric image can be acquired. The image representing the biometric information is not necessarily acquired over the whole of an image capture range of the biometric information acquisition device 8 and, for example, there is a case in which an area that is not touched by a finger of the user is present in the image capture range. The image in that area does not represent the biometric information. For example, since the biometric information is not represented in a white image area corresponding to the area that is not touched by a finger of the user, the CPU 1 of the present embodiment does not extract the samples of the points that are not in the effective area. Therefore, for example, when the peak value of the power spectrum obtained by the processing at S24 is a certain value or more, the CPU 1 determines that the point selected by the processing at S23 is a point in the effective area. In another example, when the sum of the absolute values obtained by applying a derivative filter to the color information in the predetermined range including the point selected by the processing at S23 or the sum of the squares thereof is a certain value or more, the CPU 1 determines that the point selected at S23 is a point in the effective area. When the point selected at S23 is a point in the effective area (yes at S25), the CPU 1 increments the variable N by 1, sets the point selected at S23 as the base point, and stores the coordinates of the base point and the reference direction determined at S24 in the RAM 3 (S26). When the point selected at S23 is not a point in the effective area (no at S25), or after the processing at S26, the CPU 1 determines whether or not the points to be selected on the basis of the predetermined conditions in the image acquired at S21 have been selected at S23 (S27). The CPU 1 of the present embodiment determines whether all the points in units of pixels in the area offset by the predetermined value from the outer circumference of the image have been selected at S23. When there is a point that has not been selected at S23 (no at S27), the CPU 1 returns the processing to S23. When all the points have been selected at S23 (yes at S27), the CPU 1 determines whether or not the variable N is larger than 0 (S28). When the variable N is 0 (no at S28), the CPU 1 ends the image analysis processing and returns the processing to the collation information processing in FIG. 9.

Figure 11:
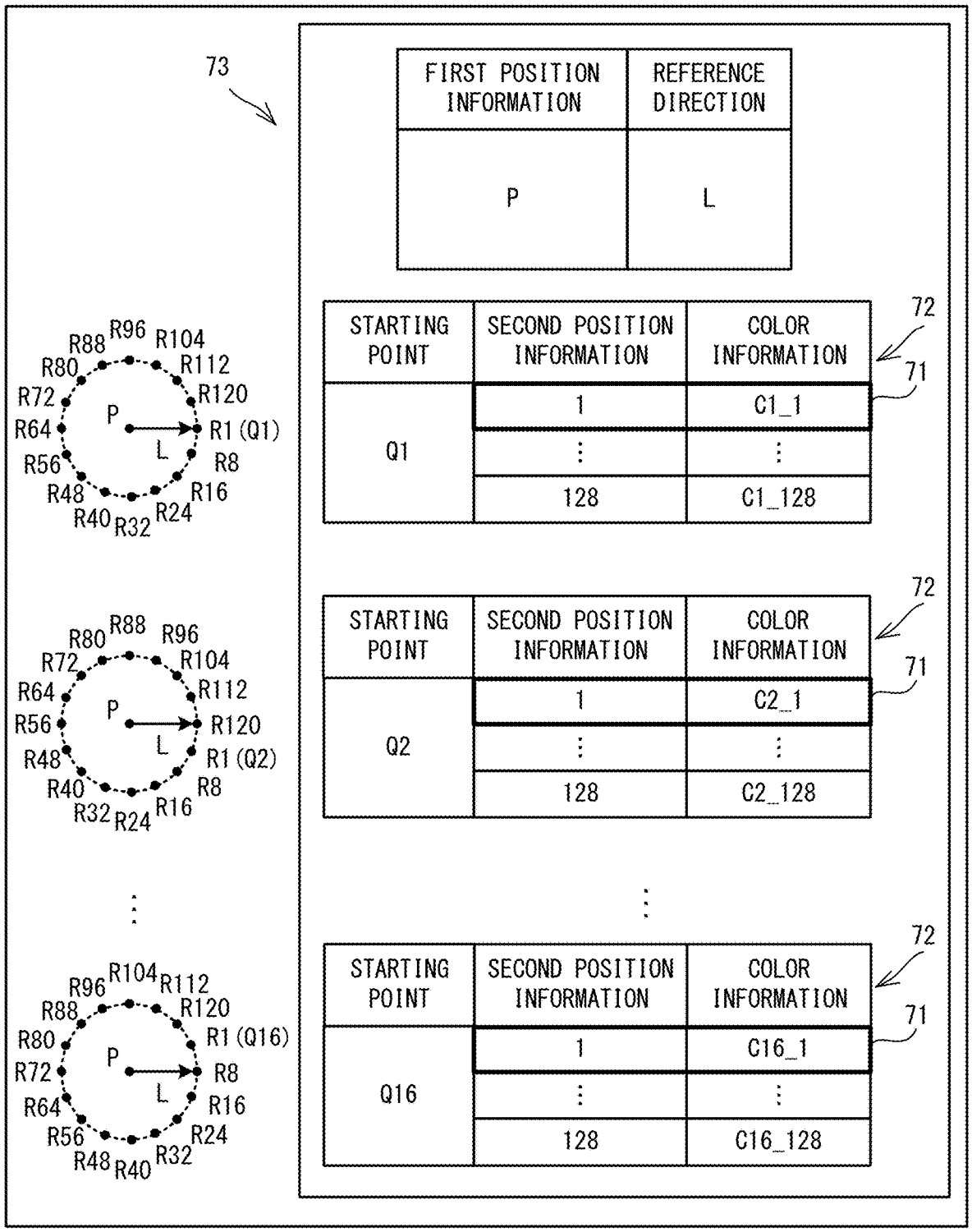
FIG. 11 is an explanatory diagram of an acquisition procedure of the samples, the sample data and sample information.

When the variable N is larger than 0 (yes at S28), the CPU 1 determines, as the base points, the points stored in the RAM 3 by the processing at S26 (S29). The CPU 1 selects one base point P from among the one or more base points determined at S29 (S31). For example, the CPU 1 selects a base point PU1 in the image 41. The CPU 1 acquires samples for the base point P selected at S31 (S32). The CPU 1 of the present embodiment sets 16 starting points Qn for the one base point P, and sets the 128 reference points Rm for each of the starting points Qn. The CPU 1 determines, as a first starting point Q1, a point whose distance from the base point P selected by the processing at S31 is a predetermined value and which is in the reference direction L with respect to the base point P. The CPU 1 sets the 16 starting points Q1 to Q16 at equal intervals in the clockwise direction from the starting point Q1, on the circumference of the circle whose center is the base point P and whose radius is the predetermined value. The CPU 1 sequentially sets the 128 reference points Rm (m is an integer from 1 to 128) at equal intervals in the clockwise direction from the starting point Qn (n is an integer from 1 to 16). The CPU 1 uses an order of setting m of the reference points Rm as the second position information. The CPU 1 acquires samples that associate the second position information m with color information Cnm that corresponds to the reference points Rm set for the starting point Qn. When the reference points Rm have the coordinates in units of sub-pixels, the color information is acquired using known bilinear interpolation or bicubic interpolation. As shown in FIG. 11, the CPU 1 acquires the samples 71 for each of the plurality of reference points Rm sequentially acquired in accordance with the predetermined conditions for each of the plurality of starting points Q1 to Q16, and stores, as sample information 73, the plurality of sample data 72 that associate each of the samples 71 with the first position information and the reference direction, in the RAM 3.

Figure 12:
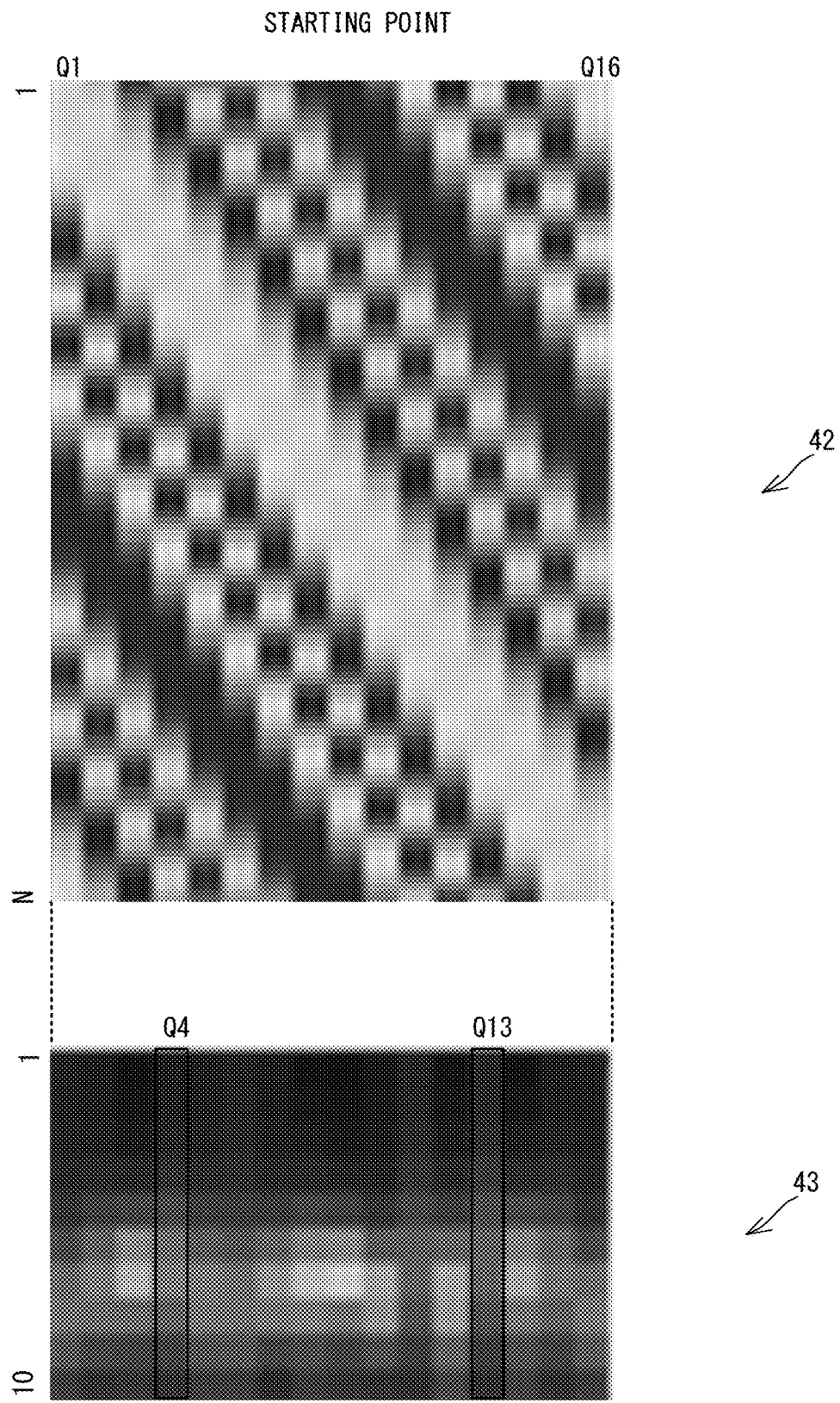
FIG. 12 is an explanatory diagram of a sample image and a frequency image representing the frequency information.

The CPU 1 generates a sample image on the basis of the samples acquired at S32 (S23). At S33, a sample image 42 shown in FIG. 12 is generated for the base point PU1 of the image 41 shown in FIG. 8. The short side direction (the left-right direction in FIG. 12) of the sample image 42 corresponds to an order of acquisition n of the starting points Qn, and the long side direction (the up-down direction in FIG. 12) corresponds to the second position information m. The color of each of pixels in the sample image 42 represents the color information of a pixel corresponding to a combination of the order of acquisition n of the starting points Qn and the second position information m.

The CPU 1 calculates the frequency information on the basis of the plurality of samples acquired at S32 (S34). The CPU 1 of the present embodiment uses the linear prediction coefficient calculated using the Yule-Walker method without applying the window function, to calculate, as the frequency information, the frequency components of changes in the color information with respect to the second position information for each of the starting points Qn. The CPU 1 calculates the linear prediction coefficient using the known Yule-Walker method without applying the window function, to the 15-th order, for example. From the calculated linear prediction coefficient, the CPU 1 calculates, for example, a one-dimensional group delay spectrum (GDS) as the frequency components, and extracts 10 characteristic numbers from a lower order value, for example. The CPU 1 calculates the frequency components (GDS, for example) of the next starting point, and repeats processing to extract 10 characteristic numbers from a lower order value, in the same manner, up to the last starting point. The frequency information obtained in this way is the same as information obtained by performing frequency analysis using, as the starting points Qn, points that are displaced by a certain angle from the base point P. In a specific example, the frequency information represented by a frequency image 43 shown in FIG. 12 is calculated. The short side direction (the up-down direction) of the frequency image 43 corresponds to a number of elements k, and the long side direction (the left-right direction) corresponds to the order of acquisition n of the starting points Qn. The color of each of pixels of the frequency image 43 indicates the GDS of a pixel k_n corresponding to a combination of the number of elements k and the order of acquisition n of the starting points Qn. In the frequency image 43, a pixel for which the GDS is relatively large is deep in color (has a high gradation value). In the frequency image 43, a pixel for which the GDP is relatively small is light in color (has a low gradation value).

Figure 13:
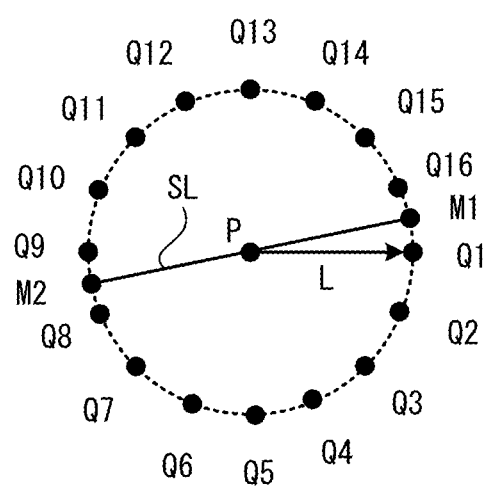
FIG. 13 is an explanatory diagram of a calculation process of an asymmetry evaluation value.

The CPU 1 calculates an asymmetry evaluation value for the base point P selected at S31 (S35). In the frequency information calculated at S34, the asymmetry evaluation value is a value obtained by comparing the frequency information for two starting points, among the plurality of starting points Qn, that are symmetric with respect to a line that passes through the base point P. As shown in FIG. 13, in the present embodiment, the line that passes through the base point P is denoted as a line SL that passes through the base point P, an intermediate point M1 between the starting point Q1 and the starting point Q16, and an intermediate point M2 between the starting point Q8 and the starting point Q9. The CPU 1 calculates an absolute value of a difference in the frequency information for each of the plurality of sets of the starting points that are symmetric with respect to the line SL, and calculates, as the asymmetry evaluation value, a sum of the calculated absolute values, a sum of squares thereof, or a square root of the sum of squares thereof. Specifically, when the frequency information of the starting point Qn is denoted as Fn, the CPU 1 calculates, as the asymmetry evaluation value, the sum of the absolute value of a difference between F1 and F16, the absolute value of a difference between F2 and F15, the absolute value of a difference between F3 and F14, the absolute value of a difference between F4 and F13, the absolute value of a difference between F5 and F12, the absolute value of a difference between F6 and F11, the absolute value of a difference between F7 and F10, and the absolute value of a difference between F8 and F9, the sum of squares thereof, or the square root of the sum of squares thereof. It is sufficient that the line SL passes through the base point P, and the setting method may be changed as appropriate.

Figure 14:
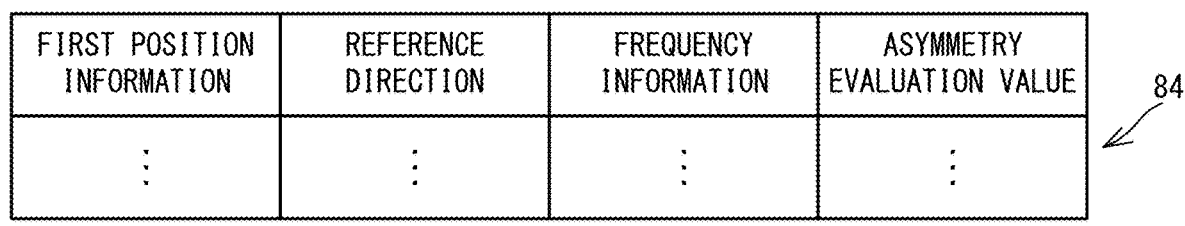
FIG. 14 is a diagram showing the collation information.

The CPU 1 causes information that associates the frequency information calculated at S34, the first position information of the base point P selected at S31, and the reference direction to be stored in the DB 28, as the collation information 84 used for the collation of the biometric information (S36). As shown in FIG. 14, the CPU 1 of the present embodiment stores, as the collation information 84, the asymmetry evaluation value calculated by the processing at S35, in addition to the first position information of the base point P, the reference direction and the frequency information. The CPU 1 determines whether or not all the base points determined by the processing at S29 have been selected by the processing at S31 (S37). The CPU 1 performs, for example, processing to assign a flag to the base point P selected by the processing at S31, and distinguishes between the base point P selected by the processing at S31 and the base point that has not been selected by the processing at S31. When there is the base point that has not been selected (no at S37), the CPU 1 returns the processing to S31. When all the base points have been selected by the processing at S31 (yes at S37), the CPU 1 ends the image analysis processing and returns the processing to the collation information processing in FIG. 9.

After S11, the CPU 1 determines whether or not the collation information including the frequency information has been acquired at S11 (S12). When the collation information has not been acquired (no at S12), the CPU 1 performs error notification (S16). For example, the CPU 1 displays an error message on the display portion 6. When the collation information has been acquired (yes at S12), CPU 1 determines whether to register, in the DB 28 (refer to FIG. 2), the collation information acquired at S11 as the reference collation information (S13). Information indicating whether or not to register is included in the start command, for example. In the specific example, it is determined that the collation information is to be registered in the DB 28 (yes at S13), and the CPU 1 stores the collation information acquired at S11 in the DB 28 of the flash memory 4 (S14). When it is determined that the collation information is not to be registered in the DB 28 (no at S13), the CPU 1 performs the collation processing in which the collation information acquired at S11 is taken as the test collation information, which is a collation target (S15). After one of S14, S15 and S16, the CPU 1 ends the collation information processing.

2. Processing at Time of Collation

Figure 15:
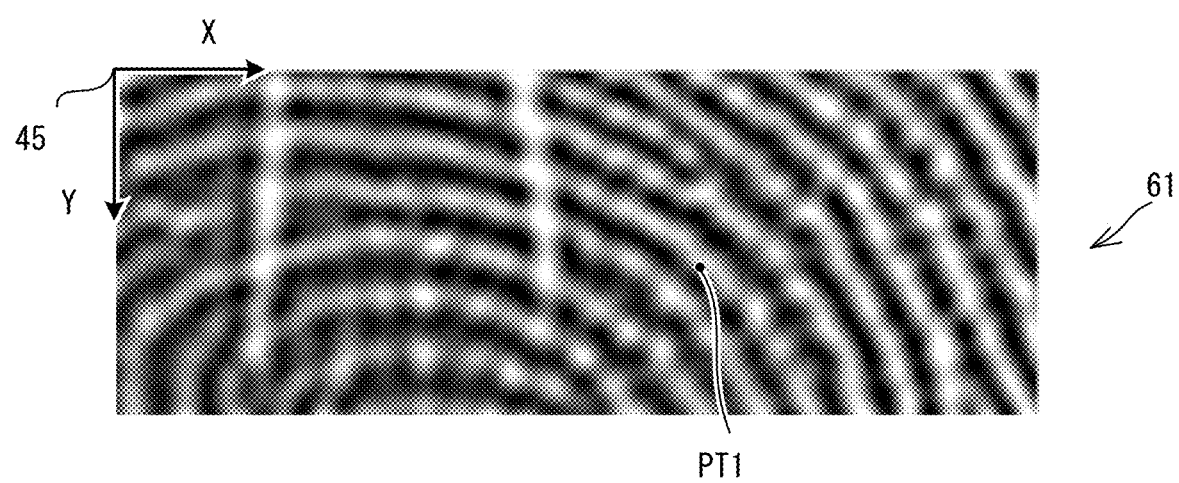
FIG. 15 is an image representing test biometric information acquired from the biometric information acquisition device.
Figure 16:
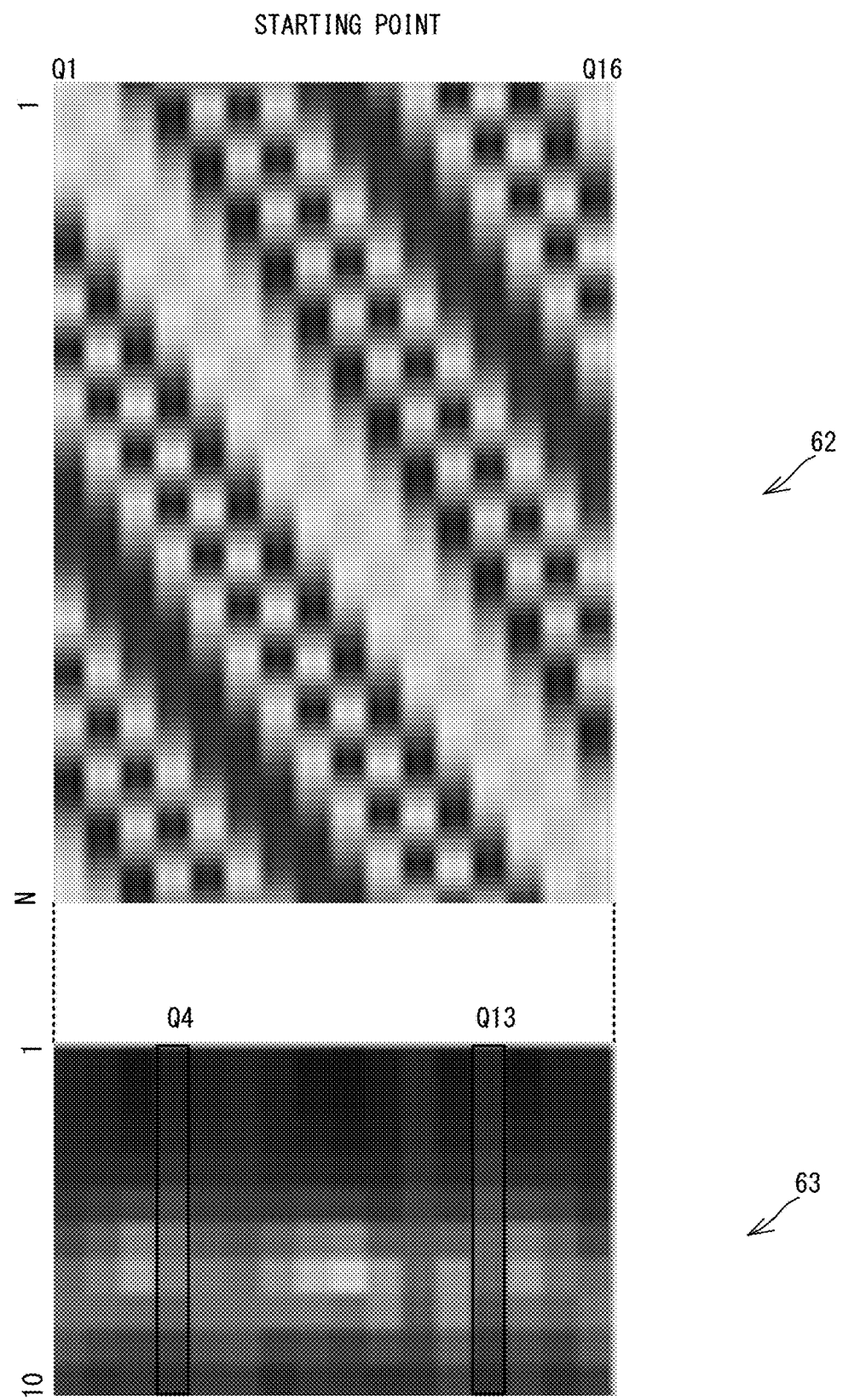
FIG. 16 is an explanatory diagram of a sample image and a frequency image representing the frequency information.

The collation information processing at the time of collation will be explained taking, as an example, a case in which the frequency information calculated from the image 41 in FIG. 8 is used as reference frequency information, and an image 61 in FIG. 15 is acquired as a test image, which is the collation target. In the collation information processing at the time of collation, S11 is performed in the same manner as in the collation information processing at the time of registration. For example, at S31 in FIG. 10, a point PT1 in FIG. 15 is acquired as the base point P, and at S33 in FIG. 10, a sample image 62 in FIG. 16 is generated. At S34 in FIG. 10, the frequency information representing a frequency image 63 in FIG. 16 is calculated. At S12 in FIG. 9, it is determined that the collation information has been acquired (yes at S12), and it is determined, on the basis of the start command, that the registration is not to be performed (no at S13). The CPU 1 performs the collation processing (S15). In the collation processing, the CPU 1 compares the reference information, which is the collation information for reference, with the test information, which is the collation information for testing, and calculates a score SC indicating a degree of similarity between them (an information similarity degree), thus performing authentication.

Figure 17:
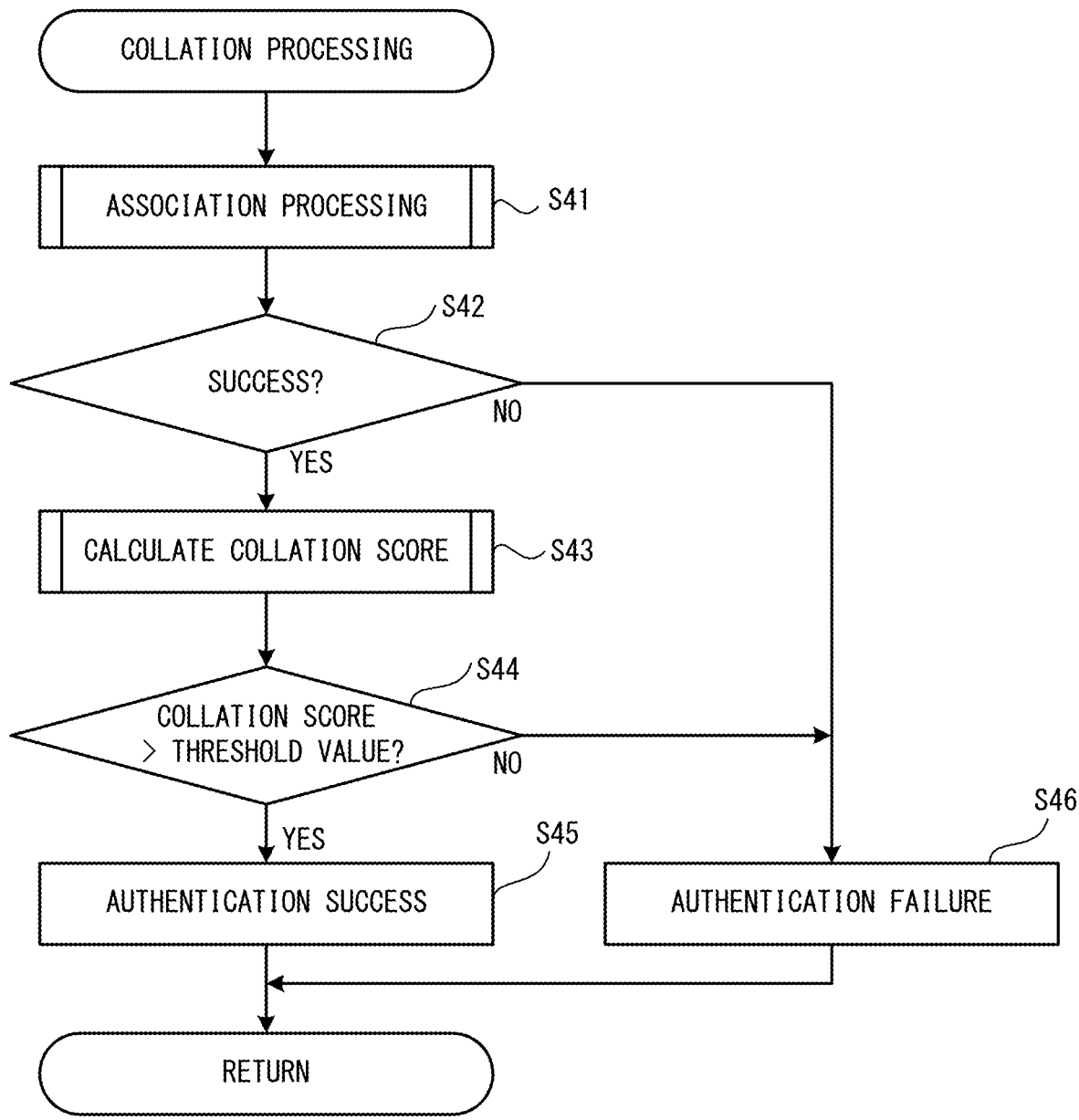
FIG. 17 is a flowchart of collation processing that is performed in the collation information processing shown in FIG. 9.
Figure 18:
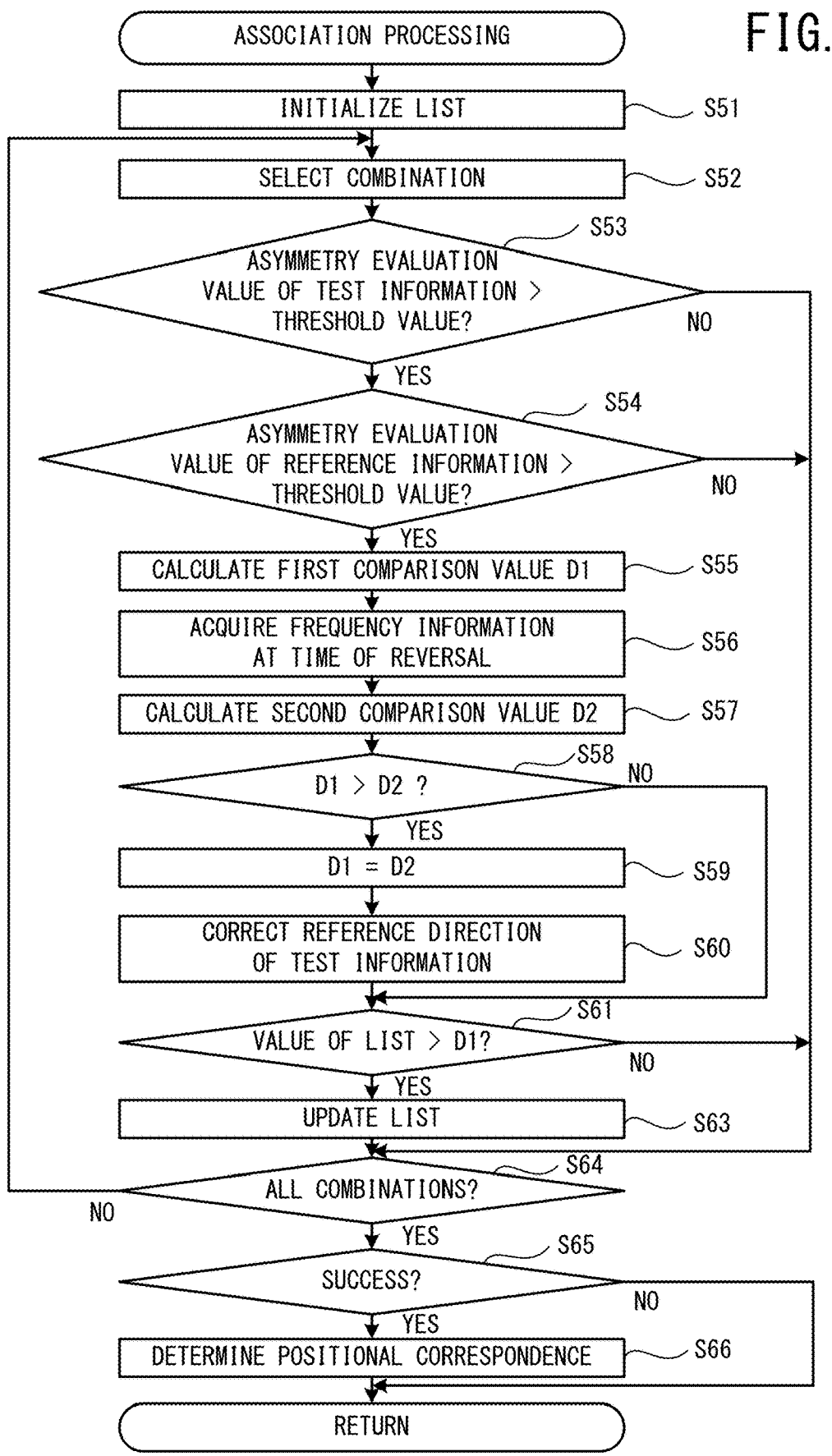
FIG. 18 is a flowchart of association processing that is performed in the collation processing shown in FIG. 17.

As shown in FIG. 17, in the collation processing, the CPU 1 performs association processing that determines a positional correspondence between the test image and the reference image, on the basis of the test information and the reference information (S41). As shown in FIG. 18, in the association processing, the CPU 1 initializes a list 85 (S51). As shown in FIG. 20, a correspondence between a combination candidate and a first comparison value D1 is stored in the list 85. The combination candidate is indicated by, for example, the coordinates of the base point (a test base point) PT acquired from the test image and the base point (a reference base point) PU acquired from the reference image corresponding to the base point PT. The first comparison value D1 is an indicator used for the selection of the candidate. The list 85 is stored in the RAM 3. From among all the combinations of the test base points PT and the reference base points PU, the CPU 1 acquires one combination for which the processing at S52 has not been performed (S52). When the number of the test base points PT is 100 and the number of the reference base points PU is 100, one combination for which the processing at S52 has not been performed is acquired from among 10,000 combinations of the test base points PT and the reference base points PU.

Figure 19:
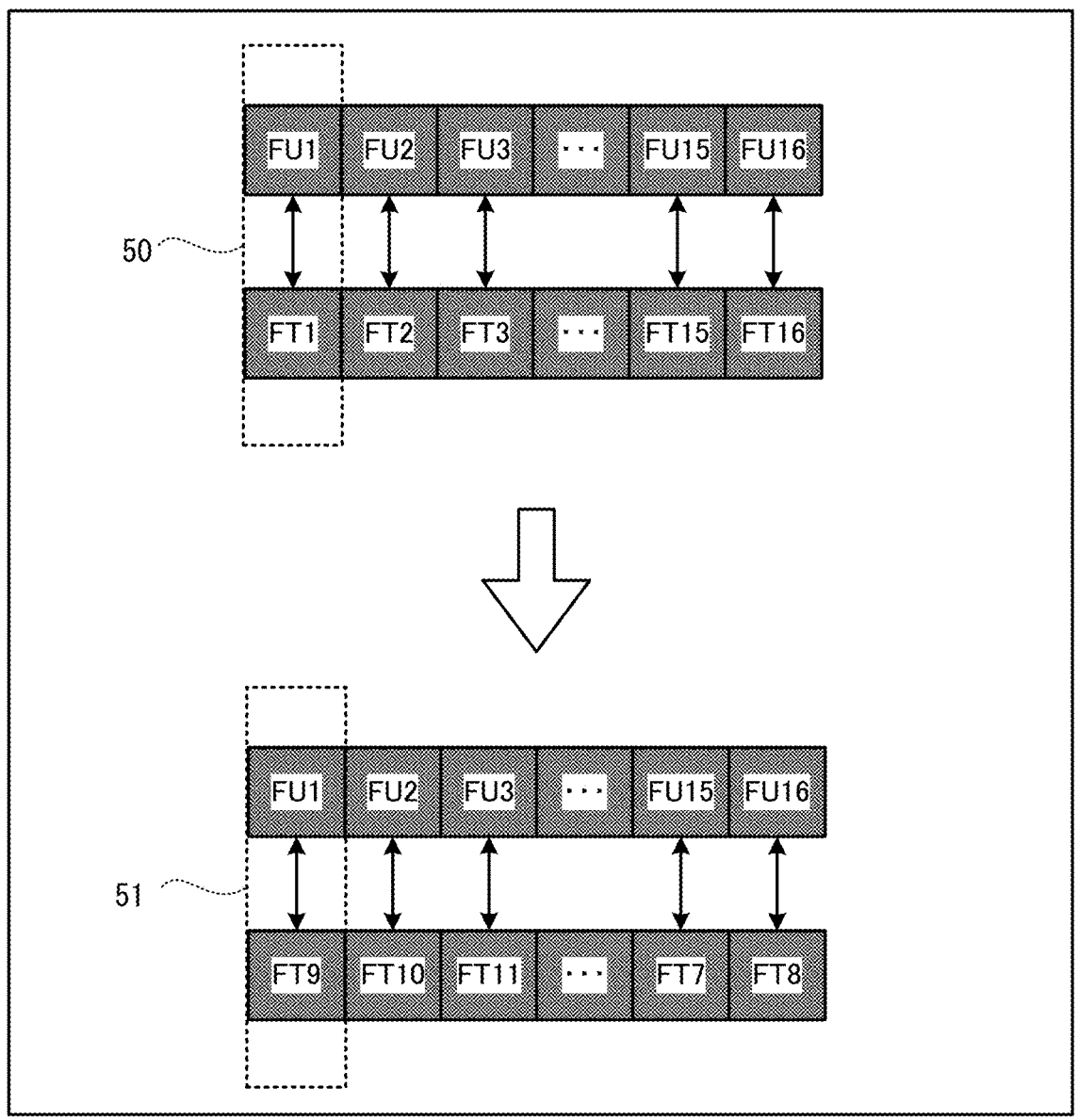
FIG. 19 is an explanatory diagram of a process that calculates a first comparison value and a second comparison value.

The CPU 1 determines whether or not the asymmetry evaluation value of the frequency information (the test information) of the test base point PT selected by the processing at S53 is larger than a threshold value (S53). The threshold value is determined in advance and stored in the flash memory 4. The asymmetry evaluation value is the value acquired by the image analysis processing (S11) in FIG. 9 and is stored in the RAM 3. When the asymmetry evaluation value of the test information is not larger than the threshold value (no at S53), the CPU 1 performs processing at S64 to be described later. When the asymmetry evaluation value of the test information is larger than the threshold value (yes at S53), the CPU 1 determines whether or not the asymmetry evaluation value of the frequency information (the reference information) of the reference base point PU selected by the processing at S53 is larger than a threshold value (S54). The threshold value at S54 is determined in advance and stored in the flash memory 4. The threshold value at S54 may be the same as or different from the threshold value at S53. The asymmetry evaluation value is the value acquired by the image analysis processing (S11) in FIG. 9 and is stored in the DB 28. When the asymmetry evaluation value of the reference information is not larger than the threshold value (no at S54), the CPU 1 performs the processing at S64 to be described later. When the asymmetry evaluation value of the reference information is larger than the threshold value (yes at S54), the CPU 1 calculates the first comparison value D1 (S55). The first comparison value D1 is a distance value between the test information and the reference information. The frequency information relating to the starting point Qn in the test information is denoted as FTn, and the frequency information relating to the starting point Qn in the reference information is denoted as FUn. In this case, the distance value is, for example, at least one of a sum of squares of differences between components corresponding to respective elements of the test information FTn and the reference information FUn exemplified by a correspondence 50 shown in FIG. 19, a sum of absolute values of the differences, and a score of DP matching. For example, the CPU 1 calculates the square of the difference for each of the combinations of the components of the elements 1 to 10 of the test information FTn shown in FIG. 19 and the components of the elements 1 to 10 of the reference information FUn, and calculates, as the distance value, the sum of the calculated squares of the differences. With respect to the test information, the CPU 1 acquires the frequency information when the reference direction is reversed (S56). The processing at S56 and S57 is processing to determine the positional correspondence while taking account of a case in which the image is reversed. This is because the biometric image is not a stable image. The CPU 1 re-arranges the test information such that the reference direction of the test information is reversed. In the example shown in FIG. 19, the CPU 1 re-arranges the test information FTn such that the starting points are set in the clockwise direction from the starting point Q9. The CPU 1 calculates a second comparison value D2 (S57). The second comparison value D2 is a distance value between the test information that has been reversed by the processing at S56 and the reference information. The distance value is a value that is calculated by the same method as that used in the processing at S55. The smaller the value of each of the first comparison value D1 and the second comparison value D2, the more similarity there is between a tendency of change in the color information around the test base point PT and a tendency of change in the color information around the reference base point PU, in comparison to when the value is relatively large.

The CPU 1 determines whether the first comparison value D1 is larger than the second comparison value D2 (S58). When the first comparison value D1 is larger than the second comparison value D2 (yes at S58), the CPU 1 sets the first comparison value D1 to the second comparison value D2 (S59). The CPU 1 corrects the reference direction associated with the test information and stores the corrected reference direction (S60). The processing at S59 and S60 is the processing to determine the positional correspondence assuming that the test image has been reversed. This is because, since the CPU 1 of the present embodiment defines the reference direction of the base point in the direction in which the power spectrum of the two-dimensional Fourier transform is peaked in the processing at S24, there is a case in which the directions of the coordinates of the reference image and the test image are reversed. Therefore, even when the directions are reversed, the CPU 1 re-arranges the frequency components and calculates the differences, and then calculates the comparison value on the basis of the frequency components with smaller differences. The CPU 1 corrects the reference direction associated with the test information so that the corrected reference direction is the reference direction of the test information reversed by the processing at S56. More specifically, the CPU 1 adds 180 degree to the reference direction associated with the test information. Therefore, depending on the calculation method of the reference direction, the processing from S56 to S60 may be omitted.

The CPU 1 determines whether or not the first comparison value D1 of the combination stored in the list 85 is larger than the first comparison value D1 of the combination selected at S52 that is calculated this time (S61). When the first comparison value D1 of the combination stored in the list 85 is larger than the first comparison value D1 of the combination selected at S52 that is calculated this time (yes at S61), the CPU 1 adds the combination of this time to the list 85 and updates the list 85 (S63). The CPU 1 of the present embodiment sets an upper limit of the number of combinations that can be registered in the list 85. Therefore, if the number of the combinations to be stored in the list 85 exceeds the upper limit when the combination of this time is added to the list 85, the CPU 1 deletes the combination for which the value of the first comparison value D1 is largest among the combinations already stored in the list 85, and adds the combination of this time to the list 85. It is sufficient that the upper limit of the number of combinations that can be registered in the list 85 is set in advance before the execution of the processing, and is set to 10, for example. The upper limit of the number of combinations that can be registered in the list 85 need not necessarily be set.

The CPU 1 determines whether or not all the combinations of the test base points PT and the reference base points PU have been selected by the processing at S52 (S64). When there is the combination that has not been selected by the processing at S52 (no at S64), the CPU 1 returns the processing to S52. When all the combinations have been selected by the processing at S52 (yes at S64), the CPU 1 determines whether one or more of the combinations of the test base points PT and the reference base points PU are stored in the list 85 (S65). When one or more of the combinations of the test base points PT and the reference base points PU are stored in the list 85 (yes at S65), the CPU 1 determines the combination of the test base point PT and the reference base point PU used for a determination of the positional correspondence between the test image and the reference image, on the basis of the candidates stored in the list 85 (S66). The CPU 1 of the present embodiment performs the following processing for each of the plurality of sets of combinations stored in the list 85. With respect to the frequency information of a predetermined range (respective points of a pixel grid with 5 pixels in the horizontal direction and 5 pixels in the vertical direction, for example) centered on the reference base point, the CPU 1 selects the frequency information in the vicinity of the coordinates of a corresponding test base point, and calculates the distance value. The CPU 1 determines the combination for which the distance value is the smallest, as the positional correspondence. The CPU 1 may determine the positional correspondence using another method, such as determining the combination for which the first comparison value D1 is the smallest among the candidates stored in the list 85, as the correspondence between the base point PT and the base point PU that are used to calculate the score SC. The score SC is the information similarity degree indicating the degree of similarity between the test information and the reference information. When the list 85 remains in the state initialized by the processing at S51 (no at S65), or after the processing at S66, the CPU 1 ends the association processing and returns the processing to the collation processing in FIG. 17.

The CPU 1 determines whether or not the determination of the positional correspondence has been performed successfully at S41 (S42). For example, when the positional correspondence is determined at S66, the CPU 1 of the present embodiment determines that the determination of the positional correspondence has been performed successfully. When the positional correspondence has not been determined (no at S42), the CPU 1 sets an authentication failure as an authentication result, and performs notification of the authentication result according to need (no at S46). The CPU 1 ends the collation processing and returns the processing to FIG. 9. When the positional correspondence has been determined (yes at S42), the CPU 1 performs score calculation processing that calculates the score SC (S43).

Figure 21:
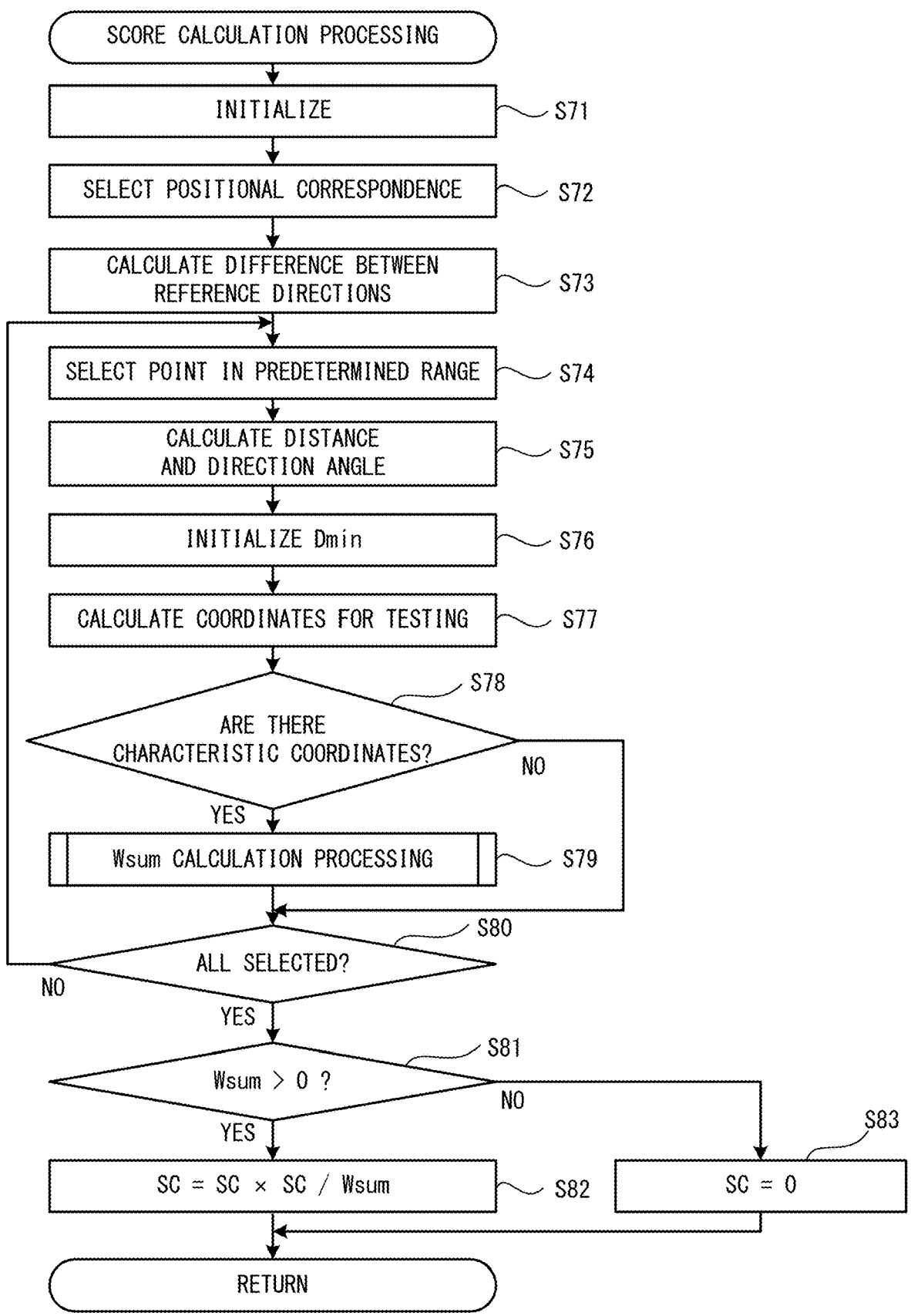
FIG. 21 is a flowchart of score calculation processing that is performed in the collation processing shown in FIG. 17.

As shown in FIG. 21, the CPU 1 initializes various setting values (S71). The CPU 1 sets the score SC and Wsum to 0. The CPU 1 selects the positional correspondence determined by the processing at S66 in FIG. 18 (S72). In a specific example, the CPU 1 acquires the reference base point PU1 and the test base point PT1 as the coordinates of the corresponding base points. The CPU 1 calculates a direction difference of the base points selected at S72 (S73). The direction difference is a difference between the reference direction of the test base point and the reference direction of the reference base point. In the specific example, a reference direction DU of the reference base point PU1 is 18 degrees, and a reference direction DT of the test base point is 42 degrees, and therefore, a difference B1 is 24 degrees. The CPU 1 selects the base point PU2 that is in a predetermined range centered on the reference base point PU1 (S74). The predetermined range is, for example, a range PRU whose center is the base point PU1 and whose radius is a predetermined value. With respect to the base point PU1 and the base point PU2 of the reference image 41, the CPU 1 calculates a distance RL on the basis of the coordinates of each point, and a direction angle from the base point PU1 toward the base point PU2 (S75). In the specific example, the CPU 1 calculates a direction angle B2 from the base point PU1 toward the base point PU2 to be 336 degrees. The CPU 1 initializes Dmin (S76). The CPU 1 of the present embodiment sets Dmin to a predetermined value and initializes Dmin. Dmin is a minimum value of the first comparison value D1 to be described later. The CPU 1 calculates the coordinates of the test image corresponding to the base point PU2 (S77). When the coordinates of the base point PT1 of the test image 61 are (x1, y1), the coordinates of the point PT2 of the image 61 corresponding to the base point PU2 are calculated to be (x1+RL, y1), from (x1+RL×cos (B2−B1), y1+RL×sin (B2−B1)). The CPU 1 determines whether or not characteristic coordinates are included in a predetermined range whose center is the point PT2 calculated at S77 (S78). The characteristic coordinates are coordinates of the base point for which the frequency information has been acquired. It is sufficient that the predetermined range is determined in advance before the execution of the processing, and is a range PRT whose center is the point PT2 calculated by the processing at S77 and whose radius is R2, for example. In the predetermined range, in a case of an image of 508 dpi obtained by capturing a fingerprint, it is confirmed that authentication performance significantly deteriorates even in a rectangular area whose center is the coordinates of the point PT2 in units of sub-pixels and whose side is 8 pixels. In the image in which the biometric information is the fingerprint, it is preferable that the point of the test image corresponding to the reference base point, and the test base point in the predetermined range are in a positional relationship such that a ridge and a trough are not located therebetween. In the processing at S78, other processing may be performed, such as selecting the coordinates of a predetermined number (four, for example) of the base points sequentially from the base point closest to the point PT2, from among the base points which are in the predetermined range PRT with respect to the point PT2 and for which the frequency information has been acquired. When the characteristic coordinates are not included in the predetermined range (no at S78), the CPU 1 performs processing at S80 to be described later. When the characteristic coordinates are included in the predetermined range (yes at S78), the CPU 1 performs Wsum calculation processing (S79).

Figure 22:
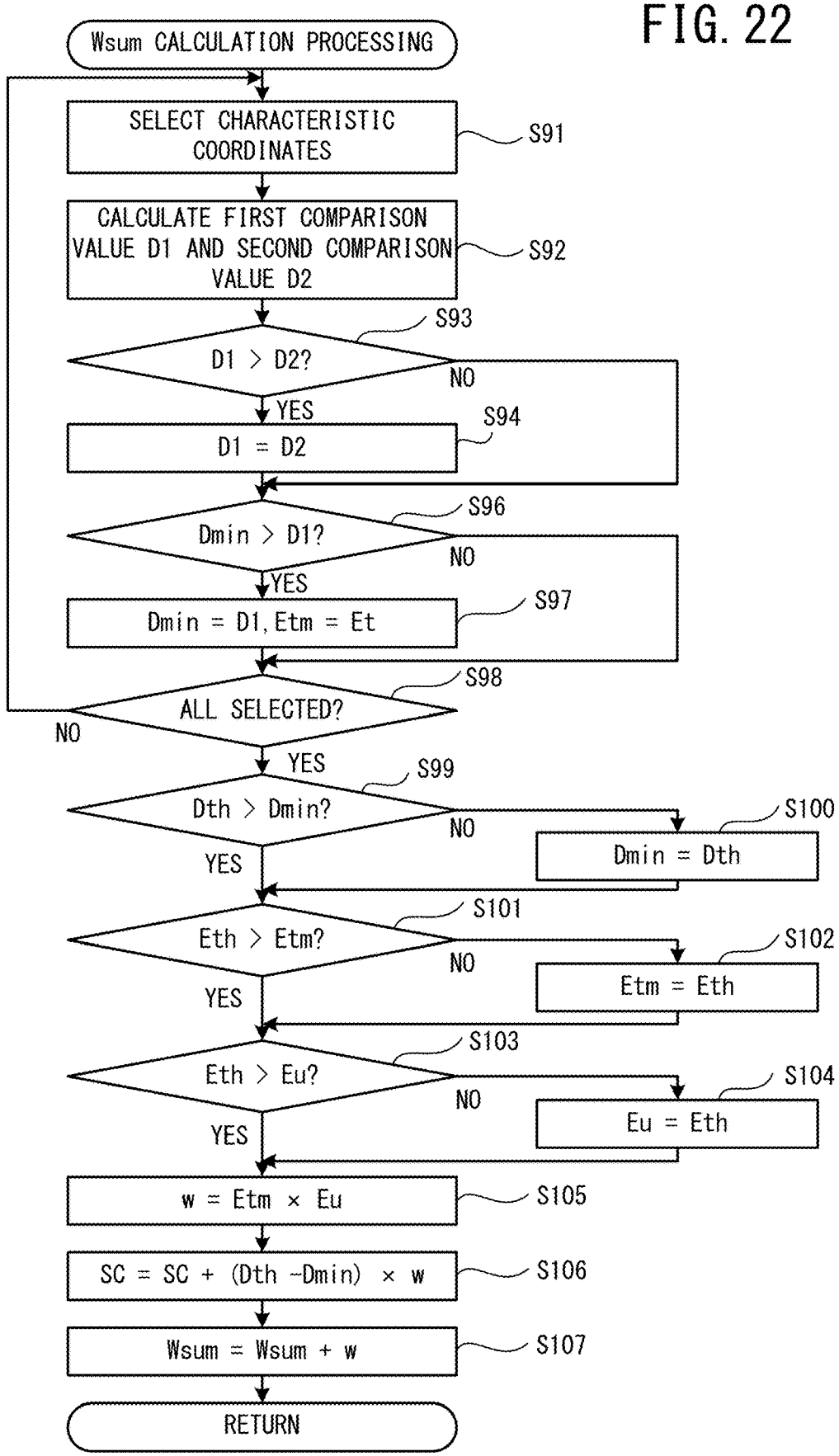
FIG. 22 is a flowchart of Wsum calculation processing that is performed in the score calculation processing shown in FIG. 21.

As shown in FIG. 22, in the Wsum calculation processing, the CPU 1 selects the coordinates (the characteristic coordinates) of the base point that has not been selected at S91, from among the base points in the predetermined range PRT whose center is the point PT2 calculated at S77 (S91). The CPU 1 calculates the first comparison value D1 and the second comparison value D2 (S92). The first comparison value D1 at S92 is a distance value between the reference information of the base point selected at S74 and the test information of the base point selected at S91. The distance value may be the same as or different from the distance value at S55 in FIG. 18. The second comparison value D2 at S92 is a distance value between the reference information of the base point selected at S74 and the test information when the reference direction of the base point selected at S91 is reversed. The distance value may be the same as or different from the distance value at S57 in FIG. 18. The CPU 1 determines whether or not the first comparison value D1 is larger than the second comparison value D2 (S93). When the first comparison value D1 is larger than the second comparison value D2 (yes at S93), the CPU 1 sets the first comparison value D1 to the second comparison value D2 (S94). When the first comparison value D1 is not larger than the second comparison value D2 (no at S93), or after the processing at S94, the CPU 1 determines whether or not Dmin is larger than the first comparison value D1 (S96). When Dmin is larger than the first comparison value D1 (yes at S96), the CPU 1 sets Dmin to the first comparison value D1, and sets Etm to Et (S97). Et is the asymmetry evaluation value of the base point selected at S91. Etm is the asymmetry evaluation value Et of the test base point for which the first comparison value D1 is Dmin.

When Dmin is not larger than the first comparison value D1 (no at S96), or after the processing at S97, the CPU 1 determines whether or not all the characteristic coordinates have been selected by the processing at S91 (S98). When there are the characteristic coordinates that have not been selected (no at S98), the CPU 1 returns the processing to S91. When all the characteristic coordinates have been selected by the processing at S91 (yes at S98), the CPU 1 determines whether or not Dmin is smaller than a threshold value Dth (S99). The threshold value Dth is stored in the flash memory 4 in advance before the execution of the processing. When Dmin is not smaller than the threshold value Dth (no at S99), the CPU 1 sets Dmin to the threshold value Dth (S100). When Dmin is smaller than the threshold value Dth (yes at S99), or after the processing at S100, the CPU 1 determines whether or not Etm is smaller than a threshold value Eth (S101). The threshold value Eth is stored in the flash memory 4 in advance before the execution of the processing. When Etm is not smaller than the threshold value Eth (no at S101), the CPU 1 sets Etm to the threshold value Eth (S102). When Etm is smaller than the threshold value Eth (yes at S101), or after the processing at S102, the CPU 1 determines whether or not Eu is smaller than a threshold value Eth (S103). Eu is the asymmetry evaluation value of the reference base point selected by the processing at S74. The threshold value Eth is stored in the flash memory 4 in advance before the execution of the processing. The threshold value Eth at S103 may be the same as or different from the threshold value Eth at S101. When Eu is not smaller than the threshold value Eth (no at S103), the CPU 1 sets Eu to the threshold value Eth (S104). When Eu is smaller than the threshold value Eth (yes at S103), or after the processing at S104, the CPU 1 calculates, as w, the product of Etm and Eu (S105). The CPU 1 adds, to the score SC, a value obtained by multiplying a comparison value, which is obtained by subtracting Dmin from Dth, by w, and updates the score SC (S106). The CPU 1 adds w calculated by the processing at S105 to Wsum, and updates Wsum (S107). The CPU 1 ends the Wsum calculation processing and returns the processing to the score calculation processing in FIG. 17.

As shown in FIG. 21, in the score calculation processing, after the processing at S79, the CPU 1 determines whether or not all the reference base points in the predetermined range PRU have been selected by the processing at S74 (S80). When there is the reference base point that has not been selected (no at S80), the CPU 1 returns the processing to S74. When all the reference base points in the predetermined range PRU have been selected by the processing at S74 (yes at S80), the CPU 1 determines whether or not Wsum calculated by the processing at S107 is larger than 0 (S81). When Wsum is larger than 0 (yes at S81), the CPU 1 sets the score SC to a value obtained by dividing the F-th power of SC ($SC^F$) by Wsum (S82). It is sufficient that F is a number stored in the flash memory 4 in advance before the execution of the processing, and is 2, for example. More specifically, the CPU 1 of the present embodiment sets the score SC to the value obtained by dividing the square of SC ($SC^2$) by Wsum. The score SC calculated at S82 is the information similarity degree that is the degree of similarity between the test information and the reference information. When Wsum is 0 (no at S81), the CPU 1 sets the score SC to 0 (S83). After the processing at S82 or S83, the CPU 1 ends the score calculation processing and returns the processing to the collation processing in FIG. 17.

As shown in FIG. 17, after the processing at S43, the CPU 1 determines whether or not the score SC calculated by the processing at S43 is larger than a threshold value (S44). The threshold value at S44 is stored in the flash memory 4 before the execution of the processing. When the score SC is larger than the threshold value (yes at S44), the CPU 1 sets an authentication success as the authentication result (S45). When the score SC is not larger than the threshold value (no at S44), the CPU 1 sets an authentication failure as the authentication result (S46). Although not shown in the drawings, the authentication result is notified to the user according to need, by being displayed on the display portion 6, for example. After the processing at S45 or S46, the CPU 1 ends the collation processing and returns the processing to the collation information processing in FIG. 9. Then, the CPU 1 ends the collation information processing.

Figure 24:
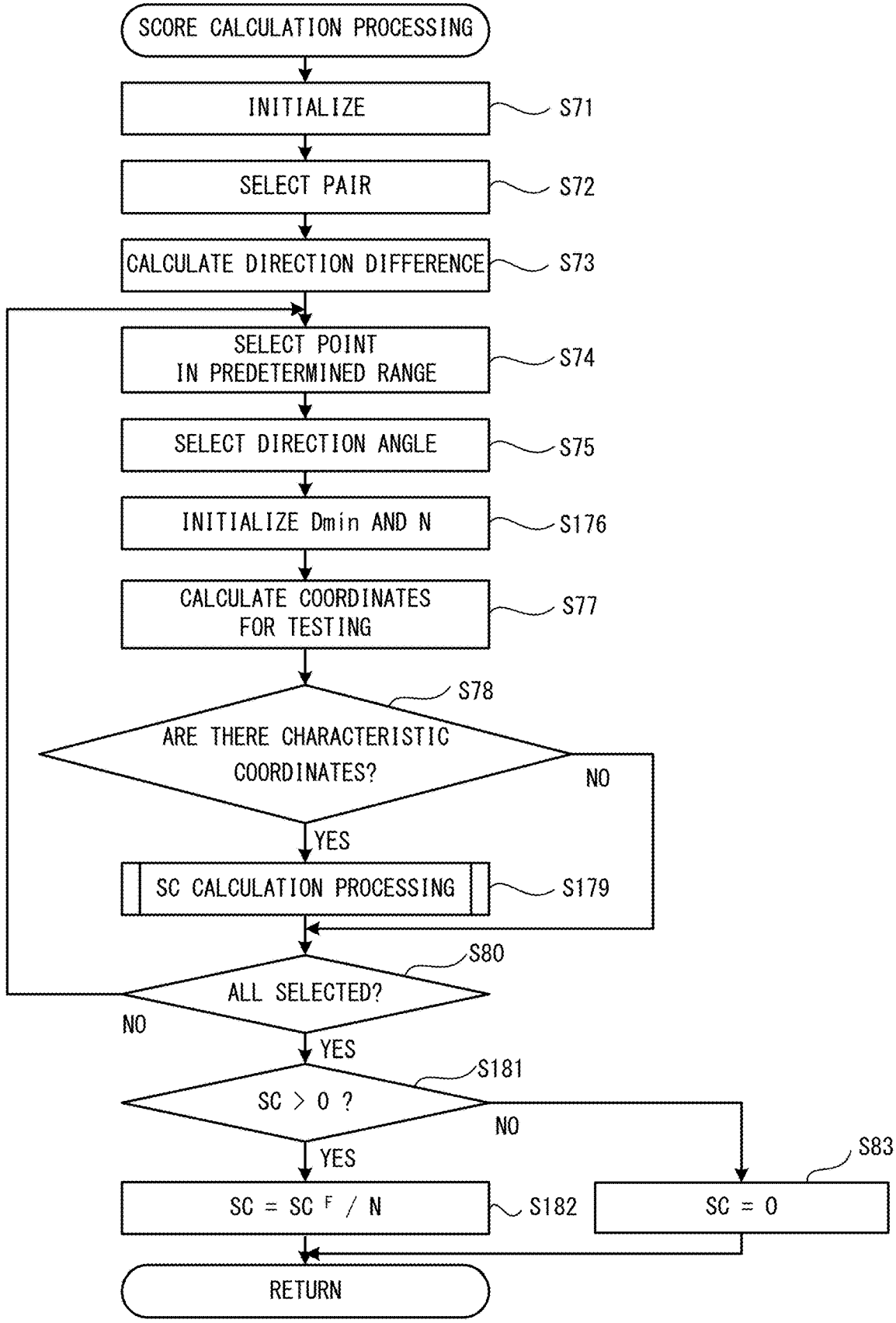
FIG. 24 is a flowchart of score calculation processing that is performed in collation processing of a second embodiment.
Figure 25:
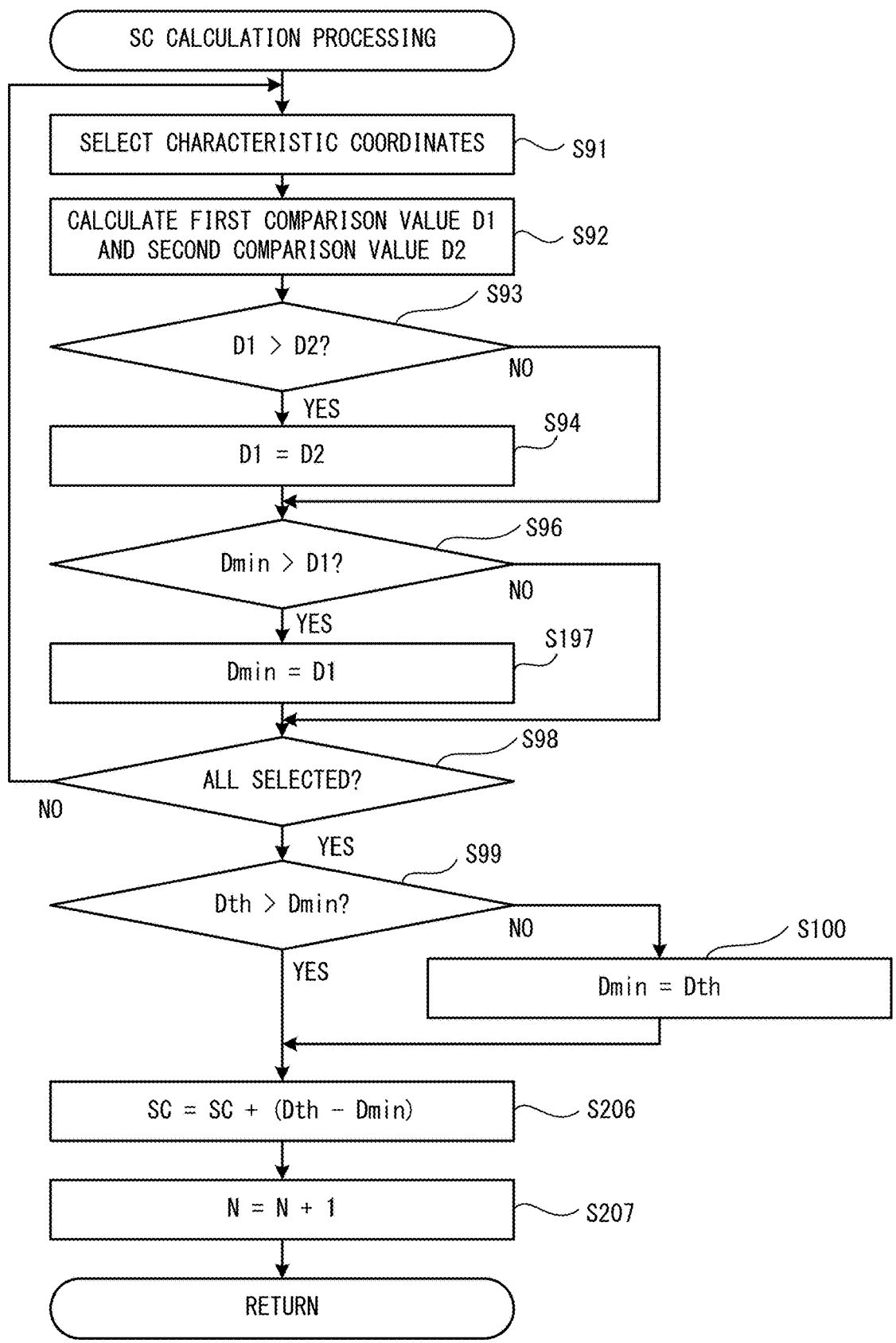
FIG. 25 is a flowchart of SC calculation processing that is performed in the score calculation processing shown in FIG. 24.

Collation information processing of a second embodiment will be explained. In the collation information processing of the second embodiment, the score calculation processing that is performed in the collation processing in FIG. 17 is different from that of the first embodiment, and other processing is the same. In the collation information processing of the second embodiment, the score calculation processing in FIG. 24 is performed. In FIG. 24 and FIG. 25, same step numbers are assigned to processing steps that are the same as those of the score calculation processing of the first embodiment. As shown in FIG. 24, the score calculation processing of the first embodiment is different from the score calculation processing of the second embodiment, in the processing at S176, S179 (S197, S206, S207), S181 and S182, and the other processing is the same. An explanation of the processing that is the same as the processing of the first embodiment will be omitted, and hereinafter, the processing that is different from the processing of the first embodiment will be explained in order.

As shown in FIG. 24, at S176, the CPU 1 initializes Dmin and N (S176). The CPU 1 of the present embodiment sets Dmin to a predetermined value, and initializes Dmin. The CPU 1 sets N to 0, and initializes N. In the processing at S179, the CPU 1 performs SC calculation processing. As shown in FIG. 25, the SC calculation processing is different from the Wsum calculation processing shown in FIG. 22 in that the processing at S197 is performed instead of the processing at S97 and the processing at S206 and S207 is performed instead of the processing at S101 to S107. In the processing at S197, Dmin is set to D1. In the processing at S206, the CPU 1 adds a value obtained by subtracting Dmin from Dth to the score SC, and updates the score SC (S206). The CPU 1 increments N by 1 (S207). Then, the CPU 1 ends the SC calculation processing and returns the processing to the score calculation processing in FIG. 24. In the processing at S181, the CPU 1 determines whether or not SC is larger than 0 (S181). When SC is larger than 0 (yes at S181), the CPU 1 performs exponentiation using SC as a base and using a predetermined weighting factor F as an exponent, and calculates a value of SC by dividing a result of the exponentiation by N (S182). When SC is 0 (no at S181), the CPU 1 performs the processing at S83 in the same manner as in the first embodiment (S83). After S182 or S83, the CPU 1 ends the score calculation processing and returns the processing to the collation processing in FIG. 17.

When the information processing device 10 performs the collation information processing in accordance with the information processing program, the following effects can be obtained. The information processing device 10 can generate the frequency information that indicates a change in color of the surrounding area of the base point in the image. The reference point is a point whose distance from the base point is the predetermined value. The samples are acquired in the order that is determined by the reference direction. Therefore, the information processing device 10 can generate the collation information that can cancel out any influence resulting from the rotation or movement, with respect to the reference, of the information represented by the image (the biometric information represented by a fingerprint image or a vein image, for example).

Figure 10:
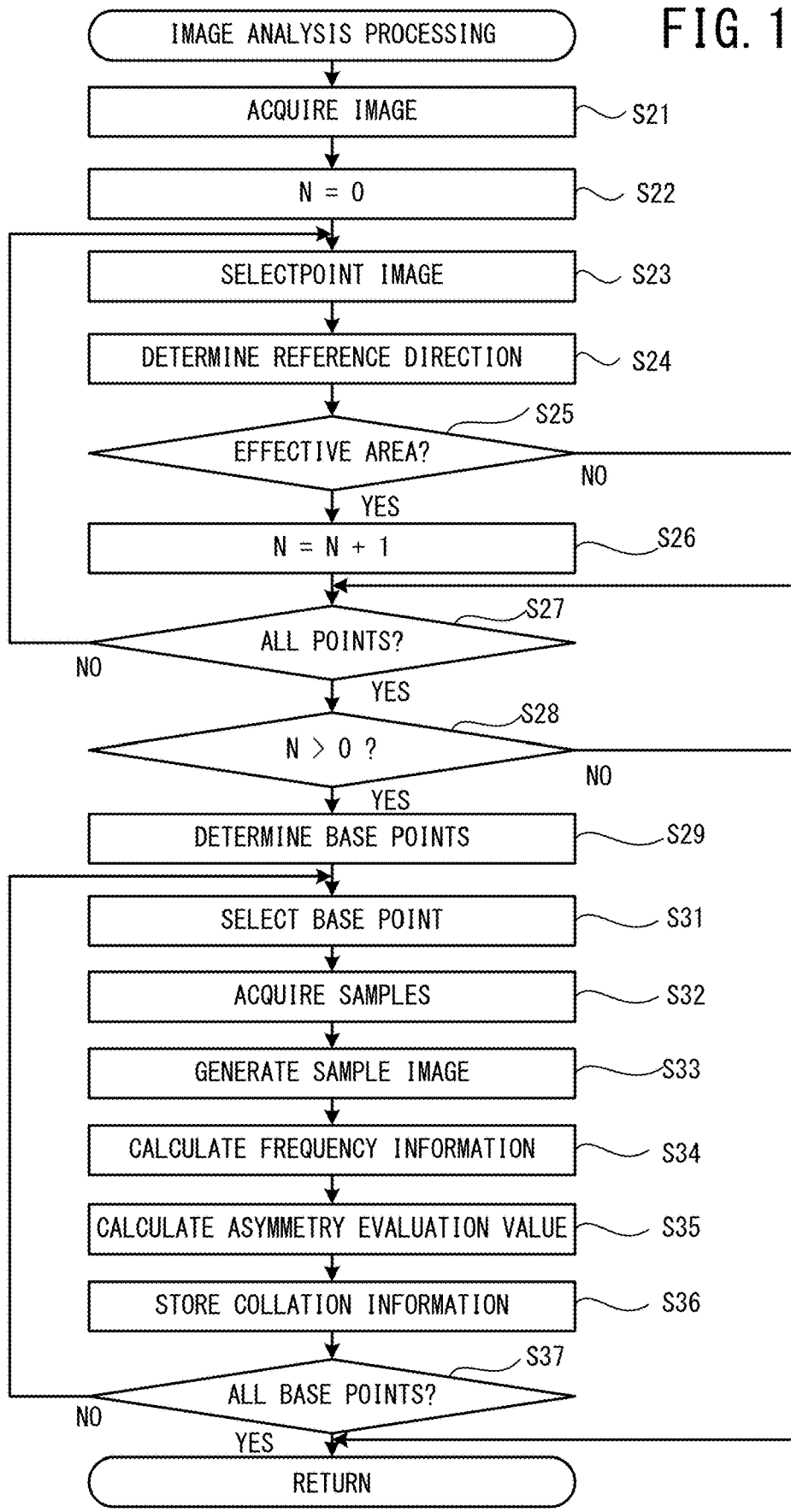
FIG. 10 is a flowchart of image analysis processing that is performed in the collation information processing shown in FIG. 9.

In the processing at S29 in FIG. 10, the CPU 1 determines a plurality of the base points from the image acquired by the processing at S21, and acquires the first position information for each of the plurality of base points. In the processing at S32, the CPU 1 sets a plurality of the starting points on the basis of the base point and the reference direction, for each of the plurality of base points determined by the processing at S29, and acquires the samples for each of the plurality of reference points acquired sequentially in accordance with the predetermined conditions for each of the plurality of starting points. The predetermined conditions of the above-described embodiment are that the reference points be set at equal intervals in the clockwise direction from the starting point. In the processing at S34, the CPU 1 uses the linear prediction coefficient calculated using the Yule-Walker method without applying the window function, to calculate, as the frequency information, the frequency components of changes in the color information with respect to the second position information acquired sequentially in accordance with the predetermined conditions for each of the plurality of starting points that are set for each of the plurality of base points determined by the processing at S29. The information processing device 10 acquires, as the frequency information, the frequency components of changes in the color information with respect to the second position information acquired sequentially in accordance with the predetermined conditions for each of the plurality of starting points. Thus, even when a determination accuracy of the reference direction is relatively low, the information processing device 10 can generate the collation information that can be used for collation. Further, through the processing from S56 to S60 and the processing from S92 to S94, the CPU 1 of the present embodiment can perform the processing while taking account of the fact that the directions of the corresponding coordinates are reversed between the reference image and the test image.

In the frequency information calculated by the processing at S34, the CPU 1 calculates a value, as the asymmetry evaluation value, by comparing the frequency information for two starting points, among the plurality of starting points, that are symmetric with respect to the line that passes through the base point (S35). In the processing at S36, the CPU 1 causes the information that associates the frequency information, the first position information, the reference direction and the asymmetry evaluation value to be stored in the flash memory 4, as the collation information that is used for the collation of the biometric information. The asymmetry evaluation value can be used as an indicator to determine whether the change in the color information of the base point is symmetrical with respect to the line that passes through the base point. The information processing device 10 can acquire the asymmetry evaluation value that can be used as an indicator of the tendency of change in the color information of the surrounding area of the base point. For example, when a plurality of ridges are arranged in parallel with each other in a substantially straight manner in the vicinity of the base point, the change in the characteristic color information is not included. Therefore, it is conceivable that the frequency information in this case is not appropriate to be used for collation. Therefore, the asymmetry evaluation value can be used to determine whether or not the frequency information corresponding to the base point is appropriate to determine the correspondence between the test collation information and the reference collation information that are used for biometrics. For example, the asymmetry evaluation value can be used for the processing to calculate the information similarity degree representing the degree of similarity between the test collation information and the reference collation information.

The CPU 1 of the information processing device 10 determines the positional correspondence, which is the correspondence between the first position information of test frequency information that is used for the collation of the biometric information in the processing at S41 in FIG. 17 and the first position information of the reference frequency information stored in the DB 28. On the basis of the positional correspondence determined by the processing at S41, the CPU 1 calculates the information similarity degree that is the degree of similarity between the test information, which is the collation information for testing, and the reference information, which is the collation information for reference (S43). The information processing device 10 can compare the test frequency information and the reference frequency information, while taking account of the influence resulting from the rotation or movement, with respect to the reference, of the information represented by the image, and can calculate the information similarity degree between the test frequency information and the reference frequency information.

In the processing at S53 in FIG. 18, the CPU 1 of the information processing device 10 selects, from the test collation information that is used for the collation of the biometric information, the test information for which the asymmetry evaluation value is equal to or more than a first threshold value (S53). The CPU 1 selects, from the reference collation information stored in the DB 28 by the processing at S54, the reference information for which the asymmetry evaluation value is equal to or more than a second threshold value (S54). The CPU 1 compares the test information selected by the processing at S53 and the reference information selected by the processing at S54, and determines the positional correspondence that is the correspondence between the first position information of the test information used for the collation of the biometric information and the first position information of the reference information stored in the DB 28 (S66). In the processing at S43 in FIG. 17, on the basis of the positional correspondence determined by the processing at S66, the CPU 1 calculates the information similarity degree (the score SC) that is the degree of similarity between the test information and the reference information (S43). By performing the processing at S53 and the processing at S54, the information processing device 10 can shorten a time required for the processing, in comparison to when the information similarity degree is calculated on the basis of all the test information and the reference information. The first threshold value may be the same as or different from the second threshold value.

At S43 in FIG. 17, on the basis of the positional correspondence determined by the processing at S66, the CPU 1 of the second embodiment calculates the comparison value by comparing the frequency information, for each of the plurality of sets of the base points corresponding to the test information and the reference information. The CPU 1 of the present embodiment uses, as the comparison value, a value obtained by subtracting Dmin from Dth. The CPU 1 performs exponentiation using the sum of the calculated comparison values as the base and using the predetermined weighting factor as the exponent, and calculates the value of the score SC by dividing a result of the exponentiation by the number of the comparison values (S182 in FIG. 24). In comparison to when the score SC is calculated using all the comparison values, the information processing device 10 can calculate the score SC with a higher matching rate. In comparison to when the weighting factor is not used, the information processing device 10 can calculate the information similarity degree having a higher matching rate.

On the basis of the positional correspondence determined by the processing at S66, the CPU 1 of the first embodiment calculates the comparison value of the frequency information for each of the plurality of sets of the base points corresponding to the test information and the reference information (S92 in FIG. 22). On the basis of the positional correspondence determined by the processing at S66, the CPU 1 calculates the product of the asymmetry evaluation value of the reference base point and the asymmetry evaluation value of the test base point, for each of the plurality of sets of the base points corresponding to the test information and the reference information (S105). The CPU 1 calculates a first sum that is a sum of the values obtained by multiplying the comparison values calculated for each of the plurality of sets of the base points, by the corresponding product (S106), and calculates a second sum that is a sum of the products (S107). The CPU 1 performs exponentiation using the calculated first sum as the base and using the predetermined weighting factor as the exponent, and calculates the value of the score SC by dividing a result of the exponentiation by the second sum (S82). In comparison to when the score SC is calculated using all the comparison values, the information processing device 10 can calculate the score SC with a higher matching rate. In comparison to when the weighting factor is not used, the information processing device 10 can calculate the score SC with a higher matching rate. In comparison to when the asymmetry evaluation value is not used, the information processing device 10 can calculate the score SC with a higher matching rate.

Figure 26:
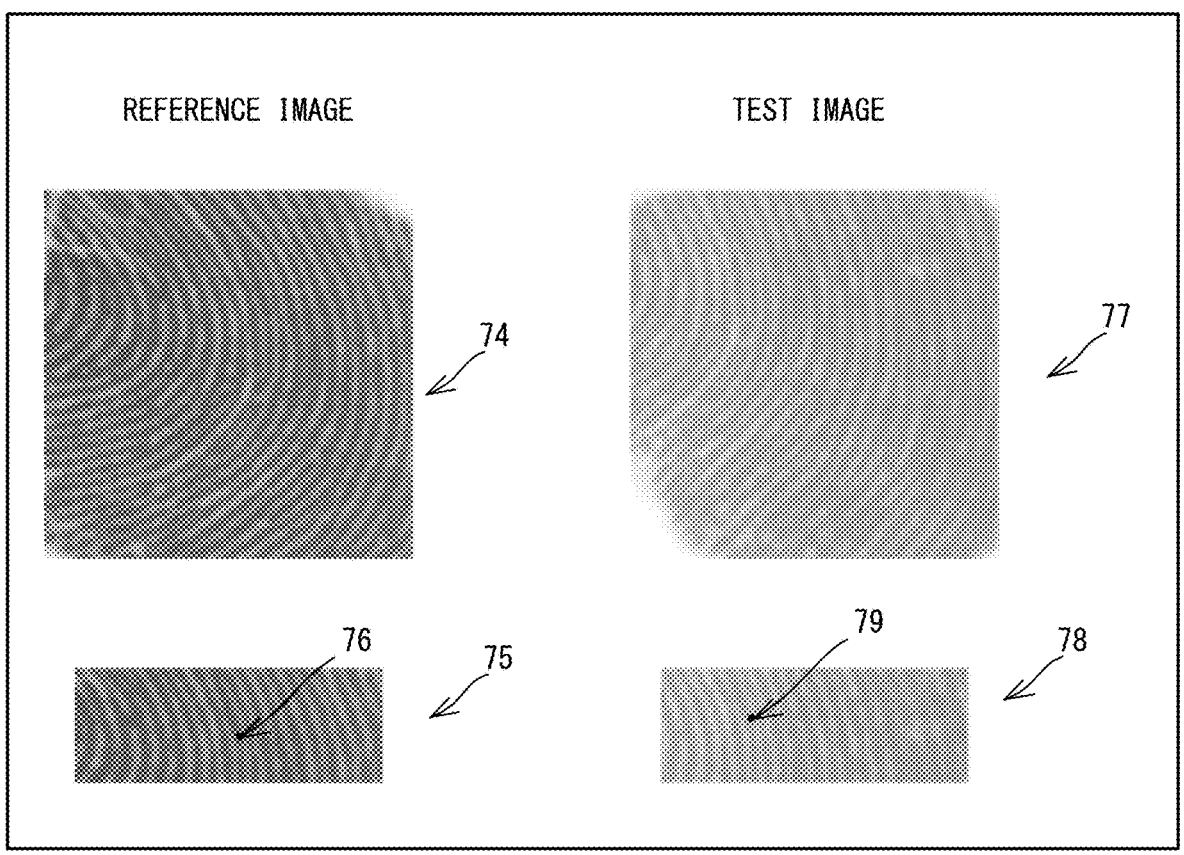
FIG. 26 is an explanatory diagram of an image used for verification.

3. Verification of Effects 3-1. Collation Using Image in Which Feature Points are not Extracted by Minutiae Method Whether or not the collation can be performed was confirmed using an image in which feature points (a branch point, an endpoint and the like) were not extracted by a minutiae method. An image 74 in FIG. 26 was used as a reference original image, and an image 77 was used as a test original image. Each of the image 74 and the image 77 is an image of 508 dpi having 192 pixels in the horizontal direction and 192 pixels in the vertical direction. The image 74 and the image 77 are images obtained by capturing a fingerprint of the same finger of the same user. Sections in which there are no feature points to be extracted by the minutiae method were respectively cut out from the image 74 and the image 77 so as to have a size of 160 pixels in the horizontal direction and 60 pixels in the vertical direction, and an image 75 and an image 78 were thereby generated.

Using the image 75 as the reference image and using the image 78 as the test image, the collation was performed in accordance with the collation information processing of the first embodiment. Although the minutiae are included in a part of the image 75, in a corresponding region of the image 78, there are no feature points to be extracted by the minutiae method. In the processing at S66, a point 76 in the image 75 and a point 79 in the image 78 were determined as a correspondence. The coordinates in the image coordinate system are (76, 26) in the image 75 and (37, 17) in the image 78. In the processing at S82, a score for which a false acceptance rate (FAR) is equal to or more than a threshold value of 0.0001% was calculated. Also in the collation information processing of the second embodiment, a similar result was obtained. From the above, it was confirmed that, even when the size of the image representing the biometric information is smaller than in related art, the information processing device 10 can generate the collation information which is unlikely to be affected by the acquisition conditions of the biometric information, and using which the collation is possible with a high accuracy.

3-2. Confirmation of Effects of Asymmetry Evaluation Value

Figure 27:
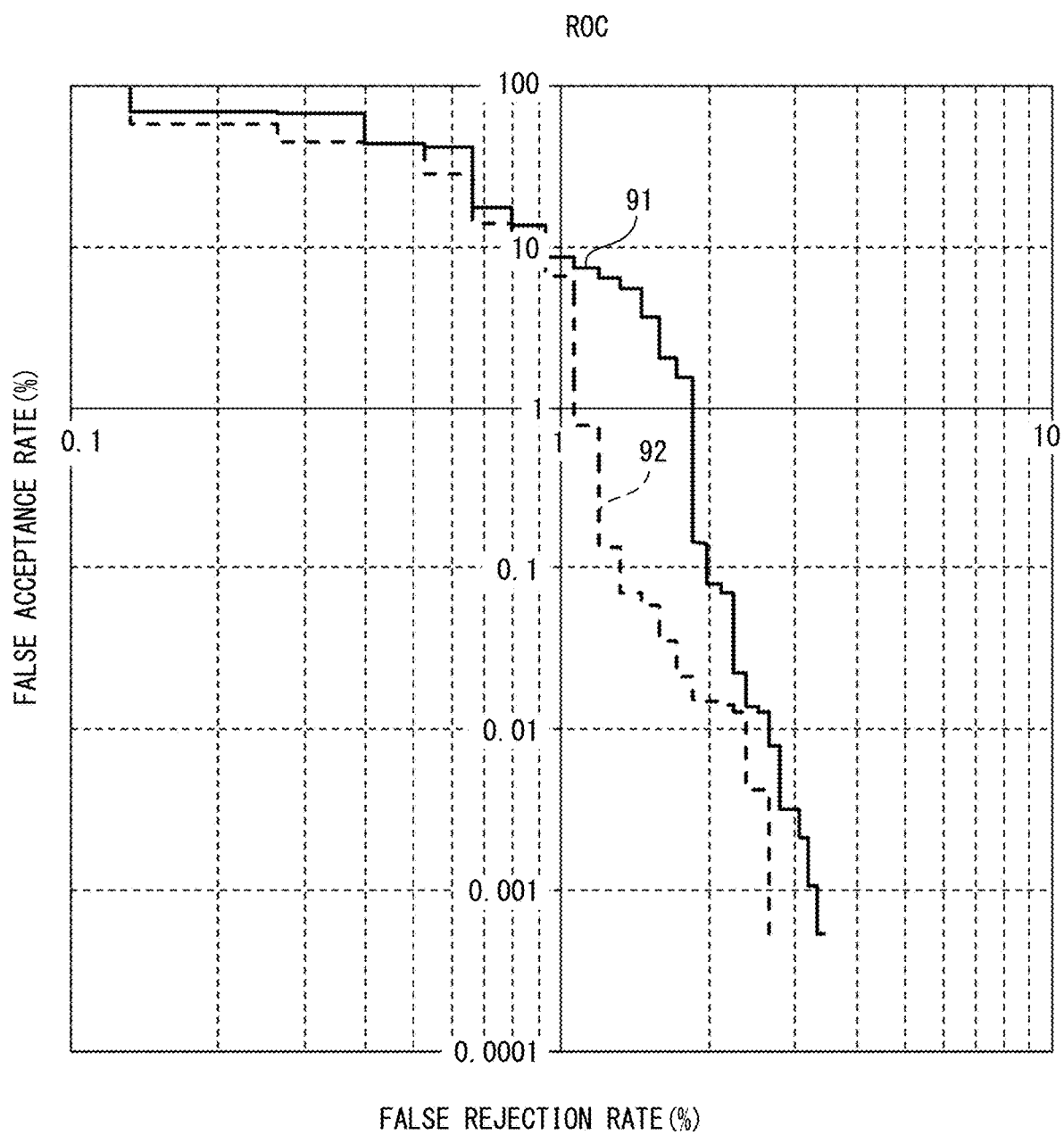
FIG. 27 is a graph showing verification results.

A case in which the processing at S53 and the processing at S54 are performed was taken as a working example, and a case in which the processing at S53 and the processing at 54 are not performed was taken as a comparison example, and effects of the processing at S53 and the processing at S54 were confirmed. With respect to 252 fingers of 42 persons, images of 508 dpi having 192 pixels in the horizontal direction and 192 pixels in the vertical direction were acquired using a compact fingerprint authentication touch sensor (FPC1020 manufactured by Fingerprint Cards AB). Then, three of the images were used as reference images, and another three of the images were used as test images (the number of collations for the same person was 756 and the number of collations between unrelated persons was 189,756), and a receiver operating characteristic (ROC) was calculated. Note that, as the score of a single image for each test, the highest score selected by collation with three reference images was used as the score for that finger. In FIG. 27, the ROC of the working example is shown as a result 92, and the ROC of the comparison example is shown as a result 91. As shown in FIG. 27, when the processing at S53 and the processing at S54 are performed and the characteristics that are smaller than the threshold value are not compared using the asymmetry evaluation value, the authentication performance of the result 92 of the working example is superior to the result 91 of the comparison example. It is conceivable that this is because, since the distance value between a region having parallel ridges in the registration image and a region having parallel ridges in the reference image and the test image tends to be smaller, a failure is unlikely to occur in the position adjustment and the scores can be calculated at correct positions. However, the processing of the threshold value using the asymmetry evaluation value contributes more to speeding up the collation than to improving the authentication performance. Although an average processing time for each collation in the working example was 3.5751 milliseconds, an average processing time for each collation in the comparison example was 5.069 milliseconds. In the working example, the collation information processing was able to be performed at approximately 70 percent of the processing time of the comparison example. Even when there is no threshold value using the asymmetry evaluation value, the authentication performance improves by increasing the number of candidates that can be stored in the list 85 used in the association processing or by enlarging the range of the base points used for comparison in the processing at S66. However, the processing time increases corresponding to that. The ROC and the average processing time in FIG. 27 indicate that the speeding up of the collation is possible without a deterioration in the authentication performance, rather than that the authentication performance is improved by the asymmetry evaluation value.

3-3 Comparison of Score Calculation Methods

Calculation methods of the score that indicates the information similarity degree were confirmed from the viewpoint of the existence/nonexistence of the asymmetry evaluation value, effects of the weight w, and effects of Wsum. With respect to 252 fingers of 42 persons, images of 508 dpi having 192 pixels in the horizontal direction and 192 pixels in the vertical direction were acquired using the compact fingerprint authentication touch sensor (FPC1020 manufactured by Fingerprint Cards AB). From each of the acquired images, ranges of 160 pixels in the horizontal direction and 60 pixels in the vertical direction were cut out so as not to overlap with each other. Using twelve reference images having the size of 160 pixels in the horizontal direction and 60 pixels in the vertical direction and twelve test images, the ROC was calculated for each of the score calculation conditions that are different from each other. Each of the twelve test images was collated with the twelve reference images, and the highest score was calculated. The number of collations for the same person was 3,024 and the number of collations between unrelated persons was 759,024. The following conditions 1 to 5 were set as the score calculation conditions.

The condition 1 is a condition in which the association processing is performed without performing the processing (S53, S54) of the threshold value using the asymmetry evaluation value in the association processing. The score SC was calculated in accordance with the method of the second embodiment. The condition 2 (there is processing of the asymmetry evaluation value compared with the threshold value) is a condition in which the processing (S53, S54) of the asymmetry evaluation value compared with the threshold value is performed in the association processing, and the processing from there onward is under the same processing condition as the condition 1. The condition 3 (there is processing of the asymmetry evaluation value compared with the threshold value, and addition of the product of the weight w) is a condition in which the processing (S53, S54) of the threshold value using the asymmetry evaluation value is performed in the association processing and the score SC is obtained by dividing the score SC calculated by the processing at S106 by N. The condition 4 (optimized scoring using Wsum) is a condition in which the score SC is obtained by the method of the first embodiment. The condition 5 (scoring by SSD) is a condition in which the score SC is calculated using a sum of squared difference (SSD), which is a score calculation method that is performed generally in pattern matching. In the SSD, generally, the sum of squares of differences in pixel values is calculated and if the value of the sum of squares is small, it is assumed that the collation is successful. However, this time, since the frequency components were taken as the characteristics, a total sum of squares di of differences in frequency components was calculated and multiplied by a negative value. Further, in the SSD, since an overlapping area is not necessarily constant, the average was calculated by dividing the calculated value by the number N of the coordinates that could be compared.

Figure 28:
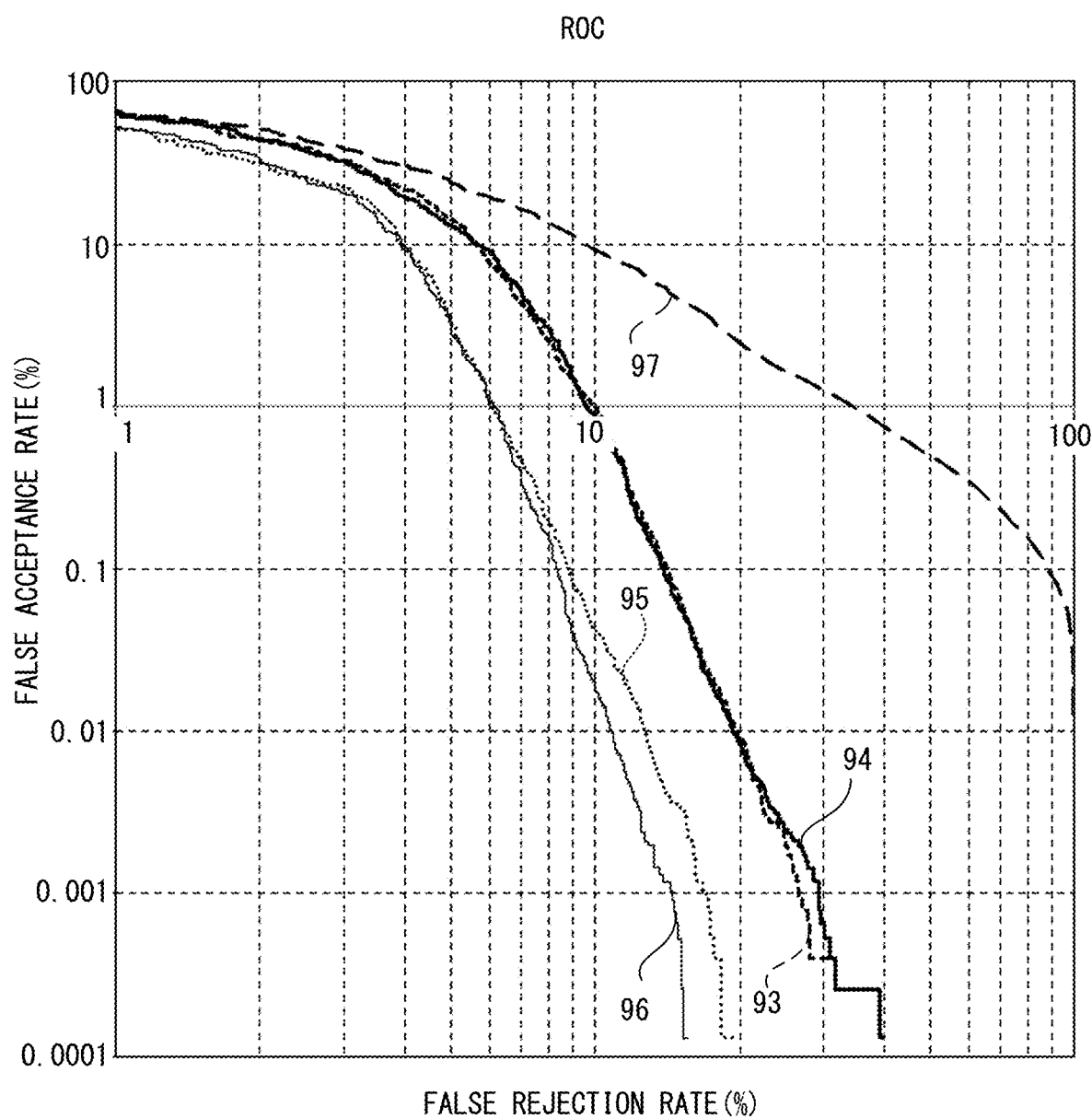
FIG. 28 is a graph showing verification results.

FIG. 28 shows verification results. The results of the condition 1 to the condition 5 are respectively shown by results 93 to 97. As shown in FIG. 28, the authentication performance was higher in the order of the condition 4 (the optimized scoring using Wsum) shown by the result 96, the condition 3 (the addition of the product of the threshold value using the asymmetry evaluation value and the weight w) shown by the result 95, the condition 1 (there is no asymmetry evaluation value) shown by the result 93, the condition 2 (there is processing of the asymmetry evaluation value compared with the threshold value) shown by the result 94, and the condition 5 (the scoring by the SDD) shown by the result 97. The condition 1 (there is no asymmetry evaluation value) shows a result of a slightly better authentication performance than the condition 2 (there is processing of the asymmetry evaluation value compared with the threshold value). It is conceivable that this is because, due to a decrease in the size of the images, the positional correspondences that cause collation errors between the same person decreased and good positional correspondences were obtained even between unrelated persons. It was confirmed that, even when tuning is performed in a general score calculation method, such as the SSD, a superior authentication performance can be obtained by the method of the present disclosure exemplified by the condition 1 to the condition 4. From the above verification, it was ascertained that the score calculation method of the present disclosure is a superior method from the viewpoint of the matching rate.

The information processing method, the information processing device, and the non-transitory computer-readable medium according to the present disclosure is not limited to the embodiments described above, and various types of modifications may be made insofar as they are within the scope of the present disclosure. For example, the modifications (A) to (C) described below may be made as desired.

(A) The configuration of the information processing device 10 may be changed as appropriate. For example, the information processing device 10 is not limited to a smart phone, and may be a mobile device, such as a notebook PC, a tablet PC or a mobile telephone, for example, or may be a device such as an automated teller machine (ATM) or an entrance and exit management device. The biometric information acquisition device 8 may be provided separately from the information processing device 10. In this case, the biometric information acquisition device 8 and the information processing device 10 may be connected by a connection cable, or may be wirelessly connected, such as with Bluetooth (registered trademark) or near field communication (NFC). The detection method of the biometric information acquisition device 8 is not limited to the capacitance method, and may be another method (for example, an electric field method, a pressure method, or an optical method). The biometric information acquisition device 8 is not limited to the surface type, and may be a linear type. The size, the color information and the resolution of the image generated by the biometric information acquisition device 8 may be changed as appropriate. Therefore, for example, the color information may be information corresponding to a color image, as well as information corresponding to a white and black image.

(B) The information processing program may be stored in a storage device of the information processing device 10 before the information processing device 10 executes the programs. Therefore, the methods by which the information processing programs are acquired, the routes by which they are acquired, and the device in which the programs are stored may each be modified as desired. The information processing programs, which are executed by the processor of the information processing device 10, may be received from another device through one of a cable and wireless communications, and they may be stored in a storage device such as a flash memory or the like. The other device may be, for example, a personal computer (PC) or a server that is connected through a network.

(C) The individual steps in the collation information processing may not necessarily be performed by the CPU 1, and some or all of the steps may also be performed by another electronic device (for example, an ASIC). The individual steps of the collation information processing may also be performed by distributed processing among a plurality of electronic devices (for example, a plurality of CPUs). The order of the individual steps in the collation information processing can be modified as necessary, and steps can be omitted and added. A case in which an operating system (OS) or the like that is operating in the information processing device 10 performs some or all of the actual processing, based on commands from the CPU 1 of the information processing device 10, and the functions of the embodiment that is described above are implemented by that processing, falls within the scope of the present disclosure. The modifications hereinafter described in paragraphs (C-1) to (C-6) may also be applied to the main processing as desired.

(C-1) Pre-processing may be performed, as appropriate, on the image acquired at S11. For example, filtering processing may be performed in order to remove high frequency components of the image as noise. As a result of performing the filtering processing, gradation changes in edge portions of the image become moderate. One of a known low pass filter, a Gaussian filter, a moving average filter, a median filter and an averaging filter may be used as a filter used for the filtering processing. In another example, the filtering processing to extract specific frequency band components only may be performed on the image acquired at S11. A band including a ridge and trough period of the fingerprint may be selected as the specific frequency band. In this case, a known band-pass filter can be taken as an example of the filter used for the filtering processing.

(C-2) The frequency components are not limited to the one-dimensional group delay spectrum. For example, as the frequency components, other known frequency components may be used, such as an LPC spectrum, a group delay spectrum, an LPC cepstrum, a cepstrum, an autocorrelation function, a cross-correlation function and the like.

(C-3) The method for calculating the information similarity degree may be changed as appropriate. For example, when a one-dimensional group delay spectrum similar to that of the above-described embodiment is used as the frequency components, there is a case in which noise components appear strongly in higher order components. Taking this type of case into consideration, the frequency information may be selected on the basis of the frequency information including a predetermined number of components that are selected while prioritizing lower order components. The predetermined number may be determined in advance while taking the sample number, the authentication accuracy and the like into consideration. For example, when the number N of the samples that are acquired for one of the first reference points is 128, the predetermined number is set to one of the values from 10 to 63. Preferably, the predetermined number is set to one of the values from 12 to 20. When the sample number is N, preferably, the predetermined number is set to a value from (sample number N/10)

to (sample number N/5). The comparison value that is used for the calculation of the score SC is not limited to the value obtained by subtracting Dmin from Dth. The CPU 1 may perform exponentiation using the score SC calculated by the processing at S106 as the base and using the predetermined weighting factor as the exponent, and may calculate the value of the score SC by dividing a result of the exponentiation by N that is calculated by the same processing as the processing at S207. The CPU 1 may perform exponentiation using the score SC calculated by the processing at S206 as the base and using the predetermined weighting factor as the exponent, and may calculate the value of the score SC by dividing a result of the exponentiation by Wsum that is calculated by the same processing as the processing at S107. The information similarity degree may be calculated by applying a known collation method to the collation information of the present disclosure.

(C-4) It is sufficient that the reference direction is a direction that indicates the characteristics of the change in the color information of the surrounding area of the base point, and the calculation method of the reference direction may be changed as appropriate. A curvature of the change in the color information of the surrounding area of the base point may be calculated as a part or all of the reference direction. The curvature is a quantity that represents the degree of curve of a curved line. Various setting values that are set in the collation information processing, the threshold values and the like may be changed as appropriate. For example, the predetermined range at S74 and the predetermined range at S78 and S91 may be changed as appropriate.

(C-5) The collation information including the frequency information need not necessarily be used in the processing that calculates the score SC. It is sufficient that the collation information includes the frequency information, the first position information and the reference direction, and the other information may be changed as appropriate. It is sufficient that the base point is a point in the image, and it may be a feature point. For example, the base point may be a point of predetermined coordinates in the image.

(C-6) The collation may be performed in combination with known collation information. For example, a collation result obtained by a known minutiae method may be combined with a collation result obtained by the collation information method of the present disclosure, and a final determination may be made. In this way, the collation is performed from a variety of viewpoints and an improvement in the collation accuracy is expected. Further, the collation method may be automatically set or may be allowed to be set by the user from among a plurality of types of collation methods, while taking account of the processing time, the authentication accuracy and the like.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An information processing method for an information processing device comprising a memory, the information processing method comprising:

acquiring an image;

determining a base point from the acquired image acquired, and acquiring first position information corresponding to a position of the base point on the image;

determining a reference direction indicating characteristics of color information of a section of the image around the determined base point determined;

acquiring a sample for each of a plurality of reference points, the plurality of reference points being on a circumference of a circle whose center is the determined base point and whose radius is a predetermined value, and the plurality of reference points being acquired sequentially in accordance with a predetermined condition from a starting point determined on the basis of the base point and the reference direction, the sample being information that associates the color information corresponding to the reference points with second position information corresponding to the positions of the reference points on the image;

calculating, as frequency information, frequency components of changes in the color information with respect to the second position information for the plurality of acquired samples, using a linear prediction coefficient calculated using a Yule-Walker method without applying a window function; and causing the memory to store information associating the calculated frequency information, the first position information and the reference direction, as collation information used for collation of biometric information.

2. The information processing method according to claim 1, wherein the determining the base point includes determining a plurality of the base points from among the acquired image, and the first position information is acquired for each of the plurality of base points, the acquiring the sample includes setting a plurality of the starting points on the basis of the base point and the reference direction, for each of the plurality of determined base points, the sample being acquired for each of the plurality of reference points acquired sequentially in accordance with the predetermined condition for each of the plurality of starting points, and the calculating the frequency information includes calculating, as the frequency information, frequency components of changes in the color information with respect to the second position information acquired sequentially in accordance with the predetermined condition for each of the plurality of starting points for each of the plurality of the determined base points determined, using the linear prediction coefficient calculated using the Yule-Walker method without applying the window function.

3. The information processing method according to claim 2, further comprising:

calculating an asymmetry evaluation value by comparing, from among the calculated frequency information, the frequency information for two starting points, among the plurality of starting points, the two starting points being symmetric with respect to a line that passes through the base point, and wherein the causing the memory to store the information includes, causing the memory to store information that associates the frequency information, the first position information, the reference direction and the asymmetry evaluation value, as the collation information used for the collation of the biometric information.

4. The information processing method according to claim 3, further comprising:
   selecting, from among the collation information for testing used for the collation of the biometric information, the collation information having the asymmetry evaluation value equal to or more than a first threshold value, as test information;
   selecting, from among the collation information for reference stored in the memory, the collation information having the asymmetry evaluation equal to or more than a second threshold value, as reference information;
   comparing the selected test information and the selected reference information and determining a positional correspondence between the first position information of the test information used for the collation of the biometric information and the first position information of the reference information stored in the memory; and
   calculating an information similarity degree between the test information and the reference information, on the basis of the determined positional correspondence.

5. The information processing method according to claim 4, wherein
   the calculating an information similarity degree includes:
      sequentially calculating a comparison value on the basis of the determined positional correspondence by comparing the frequency information for each of a plurality of sets of the base points corresponding to the test information and the reference information,
      calculating, on the basis of the determined positional correspondence, a product of the asymmetry evaluation value of the base point for testing and the asymmetry evaluation value of the base point for reference for each of the plurality of sets of the base points corresponding to the test information and the reference information,
      calculating values by multiplying the comparison values calculated for each of the plurality of sets of the base points by the product, and a first sum that is a sum of the values and a second sum that is a sum of the products, and
      performing exponentiation using the calculated first sum as a base and using a predetermined weighting factor as an exponent, and a value is calculated as the information similarity degree by dividing a result of the exponentiation by the second sum.

6. The information processing method according to claim 1, further comprising:
   determining a positional correspondence between the first position information of the frequency information for testing used for the collation of the biometric information and the first position information of the frequency information for reference stored in the memory; and
   calculating an information similarity degree between test information and reference information, on the basis of the determined positional correspondence determined, the test information being the collation information for testing, and reference information being the collation information for reference.

7. The information processing method according to claim 6, wherein
   the calculating an information similarity degree includes:
      sequentially calculating a comparison value on the basis of the determined positional correspondence by comparing the frequency information for each of a plurality of sets of the base points corresponding to the test information and the reference information;
      calculating a sum of the calculated comparison values; and
      performing exponentiation using the calculated sum of the comparison values as a base and using a predetermined weighting factor as an exponent, and a value is calculated as the information similarity degree by dividing a result of the exponentiation by a number of the comparison values.

8. An information processing device, comprising:
   a processor; and
   a memory configured to store computer-readable instructions that, when executed by the processor, instruct the processor to perform processes comprising:
   acquiring an image;
   determining a base point from the acquired image acquired, and acquiring first position information corresponding to a position of the base point on the image;
   determining a reference direction indicating characteristics of color information of a section of the image around the determined base point determined;
   acquiring a sample for each of a plurality of reference points, the plurality of reference points being on a circumference of a circle whose center is the determined base point and whose radius is a predetermined value, and the plurality of reference points being acquired sequentially in accordance with a predetermined condition from a starting point determined on the basis of the base point and the reference direction, the sample being information that associates the color information corresponding to the reference points with second position information corresponding to the positions of the reference points on the image;
   calculating, as frequency information, frequency components of changes in the color information with respect to the second position information for the plurality of acquired samples, using a linear prediction coefficient calculated using a Yule-Walker method without applying a window function; and
   causing the memory to store information associating the calculated frequency information, the first position information and the reference direction, as collation information used for collation of biometric information.

9. The information processing device according to claim 8, wherein
   the determining the base point includes determining a plurality of the base points from among the acquired image, and the first position information is acquired for each of the plurality of base points,
   the acquiring the sample includes setting a plurality of the starting points on the basis of the base point and the reference direction, for each of the plurality of determined base points, the sample being acquired for each of the plurality of reference points acquired sequentially in accordance with the predetermined condition for each of the plurality of starting points, and
   the calculating the frequency information includes calculating, as the frequency information, frequency components of changes in the color information with respect to the second position information acquired sequentially in accordance with the predetermined condition for each of the plurality of starting points for each of the plurality of the determined base points determined, using the linear prediction coefficient calculated using the Yule-Walker method without applying the window function.

10. The information processing device according to claim 9, wherein
the computer-readable instructions further instruct the processor to perform a process comprising:
calculating an asymmetry evaluation value by comparing, from among the calculated frequency information, the frequency information for two starting points, among the plurality of starting points, the two starting points being symmetric with respect to a line that passes through the base point, and
the causing the memory to store the information includes, causing the memory to store information that associates the frequency information, the first position information, the reference direction and the asymmetry evaluation value, as the collation information used for the collation of the biometric information.

11. The information processing device according to claim 10, wherein
the computer-readable instructions further instruct the processor to perform processes comprising:
selecting, from among the collation information for testing used for the collation of the biometric information, the collation information having the asymmetry evaluation value equal to or more than a first threshold value, as test information;
selecting, from among the collation information for reference stored in the memory, the collation information having the asymmetry evaluation equal to or more than a second threshold value, as reference information;
comparing the selected test information and the selected reference information and determining a positional correspondence between the first position information of the test information used for the collation of the biometric information and the first position information of the reference information stored in the memory; and
calculating an information similarity degree between the test information and the reference information, on the basis of the determined positional correspondence.

12. The information processing device according to claim 11, wherein
the calculating an information similarity degree includes:
sequentially calculating a comparison value on the basis of the determined positional correspondence by comparing the frequency information for each of a plurality of sets of the base points corresponding to the test information and the reference information,
calculating, on the basis of the determined positional correspondence, a product of the asymmetry evaluation value of the base point for testing and the asymmetry evaluation value of the base point for reference for each of the plurality of sets of the base points corresponding to the test information and the reference information,
calculating values by multiplying the comparison values calculated for each of the plurality of sets of the base points by the product, and a first sum that is a sum of the values and a second sum that is a sum of the products, and
performing exponentiation using the calculated first sum as a base and using a predetermined weighting factor as an exponent, and a value is calculated as the information similarity degree by dividing a result of the exponentiation by the second sum.

13. The information processing device according to claim 8, wherein
the computer-readable instructions further instruct the processor to perform processes comprising:
determining a positional correspondence between the first position information of the frequency information for testing used for the collation of the biometric information and the first position information of the frequency information for reference stored in the memory; and
calculating an information similarity degree between test information and reference information, on the basis of the determined positional correspondence determined, the test information being the collation information for testing, and reference information being the collation information for reference.

14. The information processing device according to claim 13, wherein
the calculating an information similarity degree includes:
sequentially calculating a comparison value on the basis of the determined positional correspondence by comparing the frequency information for each of a plurality of sets of the base points corresponding to the test information and the reference information;
calculating a sum of the calculated comparison values; and
performing exponentiation using the calculated sum of the comparison values as a base and using a predetermined weighting factor as an exponent, and a value is calculated as the information similarity degree by dividing a result of the exponentiation by a number of the comparison values.

15. A non-transitory computer-readable medium storing computer-readable instructions that are executed by a processor provided in an information processing device comprising a memory, the computer-readable instructions, when executed, instructing the processor to perform processes comprising:
acquiring an image;
determining a base point from the acquired image acquired, and acquiring first position information corresponding to a position of the base point on the image;
determining a reference direction indicating characteristics of color information of a section of the image around the determined base point determined;
acquiring a sample for each of a plurality of reference points, the plurality of reference points being on a circumference of a circle whose center is the determined base point and whose radius is a predetermined value, and the plurality of reference points being acquired sequentially in accordance with a predetermined condition from a starting point determined on the basis of the base point and the reference direction, the sample being information that associates the color information corresponding to the reference points with second position information corresponding to the positions of the reference points on the image;
calculating, as frequency information, frequency components of changes in the color information with respect to the second position information for the plurality of acquired samples, using a linear prediction coefficient calculated using a Yule-Walker method without applying a window function; and
causing the memory to store information associating the calculated frequency information, the first position information and the reference direction, as collation information used for collation of biometric information.

16. The non-transitory computer-readable medium according to claim 15, wherein
the determining the base point includes determining a plurality of the base points from among the acquired image, and the first position information is acquired for each of the plurality of base points,
the acquiring the sample includes setting a plurality of the starting points on the basis of the base point and the reference direction, for each of the plurality of determined base points, the sample being acquired for each of the plurality of reference points acquired sequentially in accordance with the predetermined condition for each of the plurality of starting points, and
the calculating the frequency information includes calculating, as the frequency information, frequency components of changes in the color information with respect to the second position information acquired sequentially in accordance with the predetermined condition for each of the plurality of starting points for each of the plurality of the determined base points determined, using the linear prediction coefficient calculated using the Yule-Walker method without applying the window function.

17. The non-transitory computer-readable medium according to claim 16, wherein
the computer-readable instructions further instruct the processor to perform a process comprising:
calculating an asymmetry evaluation value by comparing, from among the calculated frequency information, the frequency information for two starting points, among the plurality of starting points, the two starting points being symmetric with respect to a line that passes through the base point, and
the causing the memory to store the information includes, causing the memory to store information that associates the frequency information, the first position information, the reference direction and the asymmetry evaluation value, as the collation information used for the collation of the biometric information.

18. The non-transitory computer-readable medium according to claim 17, wherein
the computer-readable instructions further instruct the processor to perform processes comprising:
selecting, from among the collation information for testing used for the collation of the biometric information, the collation information having the asymmetry evaluation value equal to or more than a first threshold value, as test information;
selecting, from among the collation information for reference stored in the memory, the collation information having the asymmetry evaluation equal to or more than a second threshold value, as reference information;
comparing the selected test information and the selected reference information and determining a positional correspondence between the first position information of the test information used for the collation of the biometric information and the first position information of the reference information stored in the memory; and
calculating an information similarity degree between the test information and the reference information, on the basis of the determined positional correspondence.

19. The non-transitory computer-readable medium according to claim 15, wherein
the computer-readable instructions further instruct the processor to perform processes comprising:
determining a positional correspondence between the first position information of the frequency information for testing used for the collation of the biometric information and the first position information of the frequency information for reference stored in the memory; and
calculating an information similarity degree between test information and reference information, on the basis of the determined positional correspondence determined, the test information being the collation information for testing, and reference information being the collation information for reference.

20. The non-transitory computer-readable medium according to claim 19, wherein
the calculating an information similarity degree includes:
sequentially calculating a comparison value on the basis of the determined positional correspondence by comparing the frequency information for each of a plurality of sets of the base points corresponding to the test information and the reference information;
calculating a sum of the calculated comparison values; and
performing exponentiation using the calculated sum of the comparison values as a base and using a predetermined weighting factor as an exponent, and a value is calculated as the information similarity degree by dividing a result of the exponentiation by a number of the comparison values.

* * * * *